(12) United States Patent
Trachtenberg et al.

(10) Patent No.: US 8,355,040 B2
(45) Date of Patent: Jan. 15, 2013

(54) TELEPRESENCE CONFERENCE ROOM LAYOUT, DYNAMIC SCENARIO MANAGER, DIAGNOSTICS AND CONTROL SYSTEM AND METHOD

(75) Inventors: Marc Trachtenberg, New York, NY (US); Steven Gage, Merrick, NY (US); John Shaw, New York, NY (US); Amitava Basu, Plainsboro, NJ (US)

(73) Assignee: Teliris, Inc., New York, NY (US)

( * ) Notice: Subject to any disclaimer, the term of this patent is extended or adjusted under 35 U.S.C. 154(b) by 1126 days.

(21) Appl. No.: 12/252,599

(22) Filed: Oct. 16, 2008

(65) Prior Publication Data
US 2010/0097441 A1  Apr. 22, 2010

(51) Int. Cl.
*H04N 7/14* (2006.01)
*G06F 3/00* (2006.01)

(52) U.S. Cl. .................... 348/14.09; 715/756
(58) Field of Classification Search .......... 348/14.08, 348/14.09; 715/751, 756
See application file for complete search history.

(56) References Cited

U.S. PATENT DOCUMENTS

| | | | |
|---|---|---|---|
| 4,847,829 A | 7/1989 | Tompkins et al. | |
| 6,922,718 B2 | 7/2005 | Chang | |
| 7,456,858 B2 | 11/2008 | Schrader et al. | |
| 7,477,281 B2 | 1/2009 | Chandra et al. | |
| 7,773,581 B2 | 8/2010 | Punj et al. | |
| 8,065,614 B2 | 11/2011 | Ma et al. | |
| 2002/0196328 A1 | 12/2002 | Piotrowski | |
| 2003/0149724 A1 | 8/2003 | Chang | |
| 2004/0119814 A1 | 6/2004 | Clisham et al. | |
| 2005/0197877 A1 | 9/2005 | Kalinoski | |
| 2006/0028983 A1 | 2/2006 | Wright | |
| 2006/0256187 A1 | 11/2006 | Sheldon et al. | |
| 2006/0284786 A1 | 12/2006 | Takano et al. | |
| 2007/0219981 A1* | 9/2007 | Takaai et al. ............... 707/5 |
| 2008/0136896 A1 | 6/2008 | Graham et al. | |
| 2008/0195705 A1* | 8/2008 | Lee ............... 709/204 |
| 2008/0215409 A1 | 9/2008 | Van Matre | |

FOREIGN PATENT DOCUMENTS

| | | |
|---|---|---|
| EP | 0351757 A2 | 1/1990 |
| EP | 0724362 A1 | 7/1996 |
| WO | 2008101117 A1 | 8/2008 |

OTHER PUBLICATIONS

International Search Report and Written Opinion of International Searching Authority; PCT/US2009/060934; Nov. 23, 2009; 6 pages.
European Search Report; Application No. EP 08 72 9907; Nov. 22, 2010; 8 pages.
International Search Report; PCT/US08/54013; May 9, 2008; 1 page.

* cited by examiner

*Primary Examiner* — Christopher M Brandt
(74) *Attorney, Agent, or Firm* — St. Onge Steward Johnston & Reens LLC

(57) ABSTRACT

A method of conducting an audio-visual conference among a number of conference rooms comprising storing predetermined conference configuration data in a computer system for a plurality of room types and a plurality of combinations of configuration factors, receiving conference variable data, generating a room list of included conference rooms, generating interconnection data for each included conference room according selected by said a computer system performing a recursive process until a feasible set of configuration data is found which permits interconnection to every other included conference room, and if no applicable set of configuration data is feasible, the distribution process returns to a next higher room in said room list.

7 Claims, 10 Drawing Sheets

TELEPRESENCE CONFERENCE ROOM LAYOUT, DYNAMIC SCENARIO MANAGER, DIAGNOSTICS AND CONTROL SYSTEM AND METHOD

FIELD OF THE INVENTION

This invention pertains to the field of teleconferencing and telepresence systems and methods and, in particular, to dynamic teleconferencing and telepresence systems and methods encompassing multiple locations.

BACKGROUND AND SUMMARY OF THE INVENTION

Audio/video teleconferencing has become an important and effective method of communication between individuals and groups over great distances. While prior ("legacy") audio/video teleconferencing systems have provided improvements over audio-only conferencing methods (for example, telephone conferencing), the difference between in-person conferences and the legacy audio/video teleconference systems remains substantial.

It is known that a significant amount of communication between individuals occurs in non-verbal form (such as eye contact, facial expressions, "body language", hand gestures, and other non-verbal cues). It has been found that the legacy teleconferencing systems do not effectively convey such non-verbal communication. Thus, there is a need for an improved teleconferencing system and method that more closely imitates an in-person conference.

The telepresence system and method of the present invention fulfill the need for an improved audio/video teleconferencing system by providing telepresence conference rooms which closely mimic an in-person conference, and by providing a system and method for automatically operating conferences held between such telepresence conference rooms, including the scheduling, configuration, initiation, diagnosis, monitoring, fault correction, and termination of such conferences. The telepresence system and method may also incorporate legacy teleconference rooms into a telepresence conference.

BRIEF DESCRIPTION OF THE DRAWINGS

For a complete understanding of the above and other features of the invention, reference shall be made to the following detailed description of the preferred embodiments of the invention and to the accompanying drawings, wherein.

DETAILED DESCRIPTION OF THE PREFERRED EMBODIMENTS

The present invention is related to the teleconference system and methods disclosed in the applicant's PCT patent application Ser. No. PCT/US08/54013 and applicant's U.S. provisional patent application Ser. No. 60/889,807, the disclosures of which are hereby incorporated in their entirety by reference.

Telepresence Conference Room Layout

Figure 1:
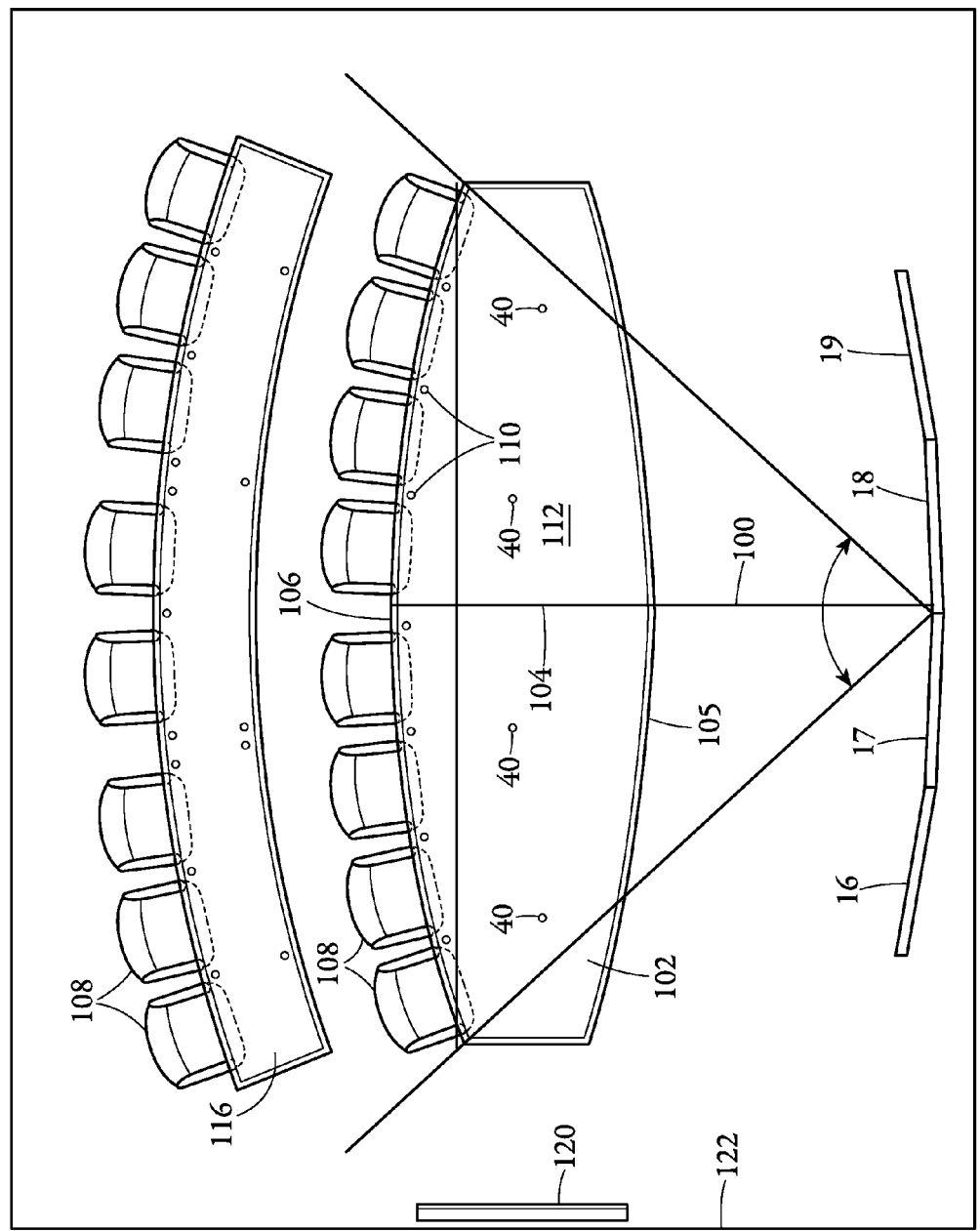
FIGS. 1-3 are plan views of telepresence conference rooms constructed in accordance with the invention.
Figure 2:
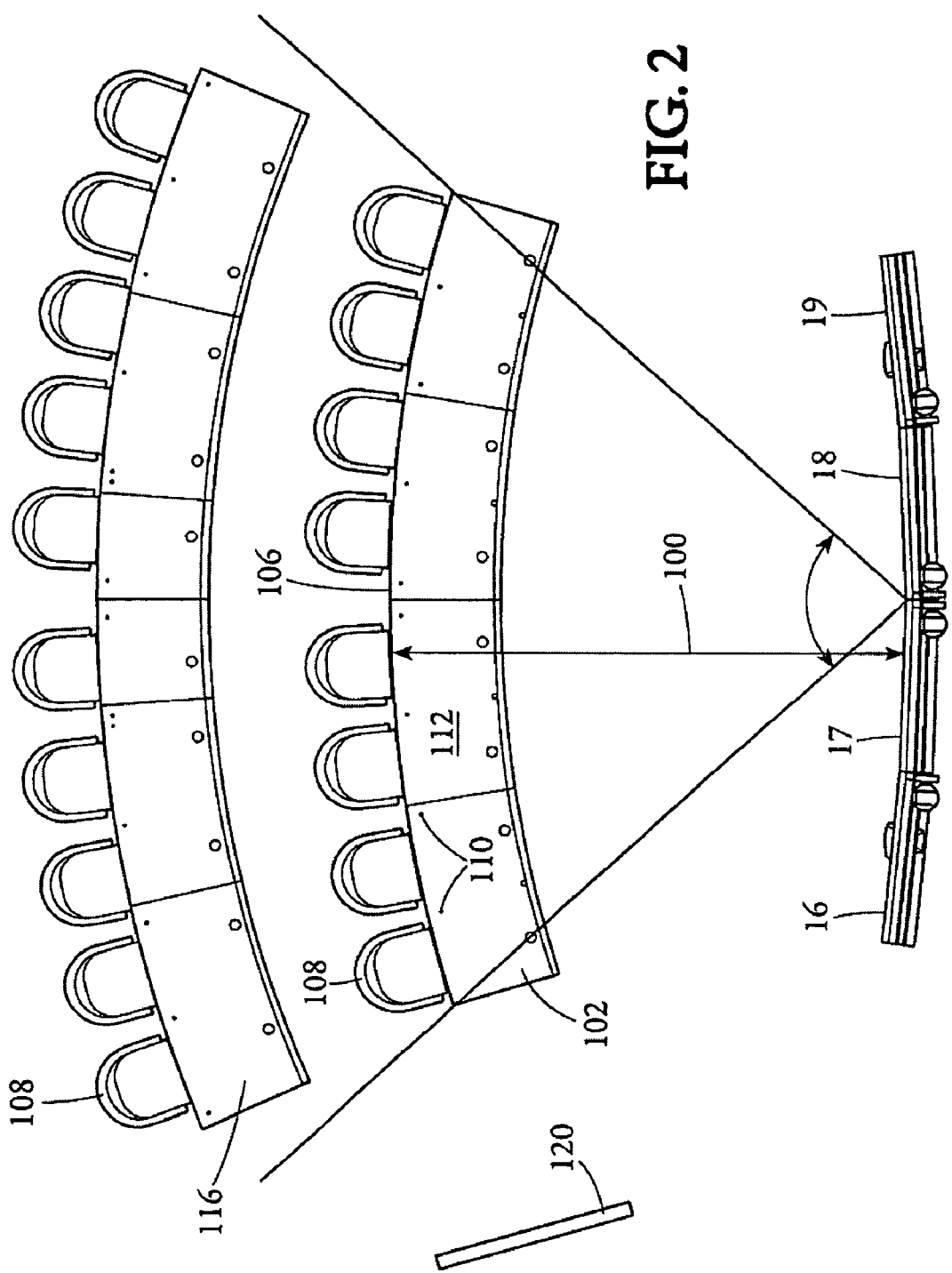

Referring to FIGS. 1 and 2, telepresence conference rooms of the present invention are carefully designed to closely mimic an in-person conference held at a conference table. To closely mimic an in-person conference, most of the attributes of the telepresence room are carefully predetermined and controlled, including the general room layout, the table size, shape and position, the maximum number of participants and their seating positions, the number, size and location of participant displays, the location of any alternative display(s) (e.g., laptop computer presentation screens), the location of any lecterns, the lighting controls, the microphone and speaker placement, the room acoustics, the operation of windows and shades, the cabling, the climate, the color, pattern and texture of walls, the furniture and other room surfaces, and the overall aesthetics of the room.

The room layout is affected by a number of factors, including the number of participants in a room, the size of the conference table, the angle of the view of the cameras, the amount and type of the video displays, whether the displays are mounted on a wall or on a free-standing support, and other factors.

Participant Displays

Each telepresence conference room of the present invention has a plurality of large, flat-screen participant displays 16, 17, 18, 19 mounted to a wall or to a free-standing support structure. Preferably, each participant display is a high-definition, wide-format (16:9 aspect ratio), LCD or plasma display and is substantially identical in size and appearance to the other participant displays in the room. Preferably the participant displays have a diagonal active display dimension of greater than about 46".

The participant displays 16, 17, 18, 19 in a given telepresence room are preferably mounted at a consistent, predetermined height off of the floor such that the bottom of the active display area of each participant display is about equal in height to the top of the conference table, or, between about 27 inches (68.5 cm) and about 30 inches (76.2 cm) off of the floor.

Preferably, there are at least four such participant displays in each telepresence room, with two "central" participant displays 17, 18 arranged symmetrically on either side of a longitudinal (front-to-back) axis of symmetry 100 of the telepresence room, and further participant displays located on either sides of the central participant displays. Alternatively, there may be 1, 2, 3 or 5, or some other number of participant displays. The participant displays are arranged such that adjacent displays closely abut one another, thereby forming a horizontally-elongated, contiguous or nearly-contiguous composite participant display. Each participant display is preferably assigned a position indicator in the system, for example 0, 1, 2 and 3, from left to right, for a 4-display room.

Preferably, the distance between active display portions of adjacent displays is less than or equal to about one inch to approximate the appearance of a contiguous or near-contiguous composite participant display. Aesthetic border portions of the individual participant displays (i.e., inactive areas or "bezels") located between active portions of adjacent individual displays are removed or reduced to minimize the distance between the active portions of the adjacent displays. Each participant display is fixed at a predetermined orientation about a vertical axis such that the plurality of displays forms a gentle arc which is concave (open) toward the conference table 102, such that the arc is similar in shape to an adjacent edge 105 of the conference table and such that the arc has a center of curvature on the longitudinal axis 100 of the telepresence room 102, which center of curvature is located behind the seating positions of the conference participants.

Participant Cameras

Figure 3:
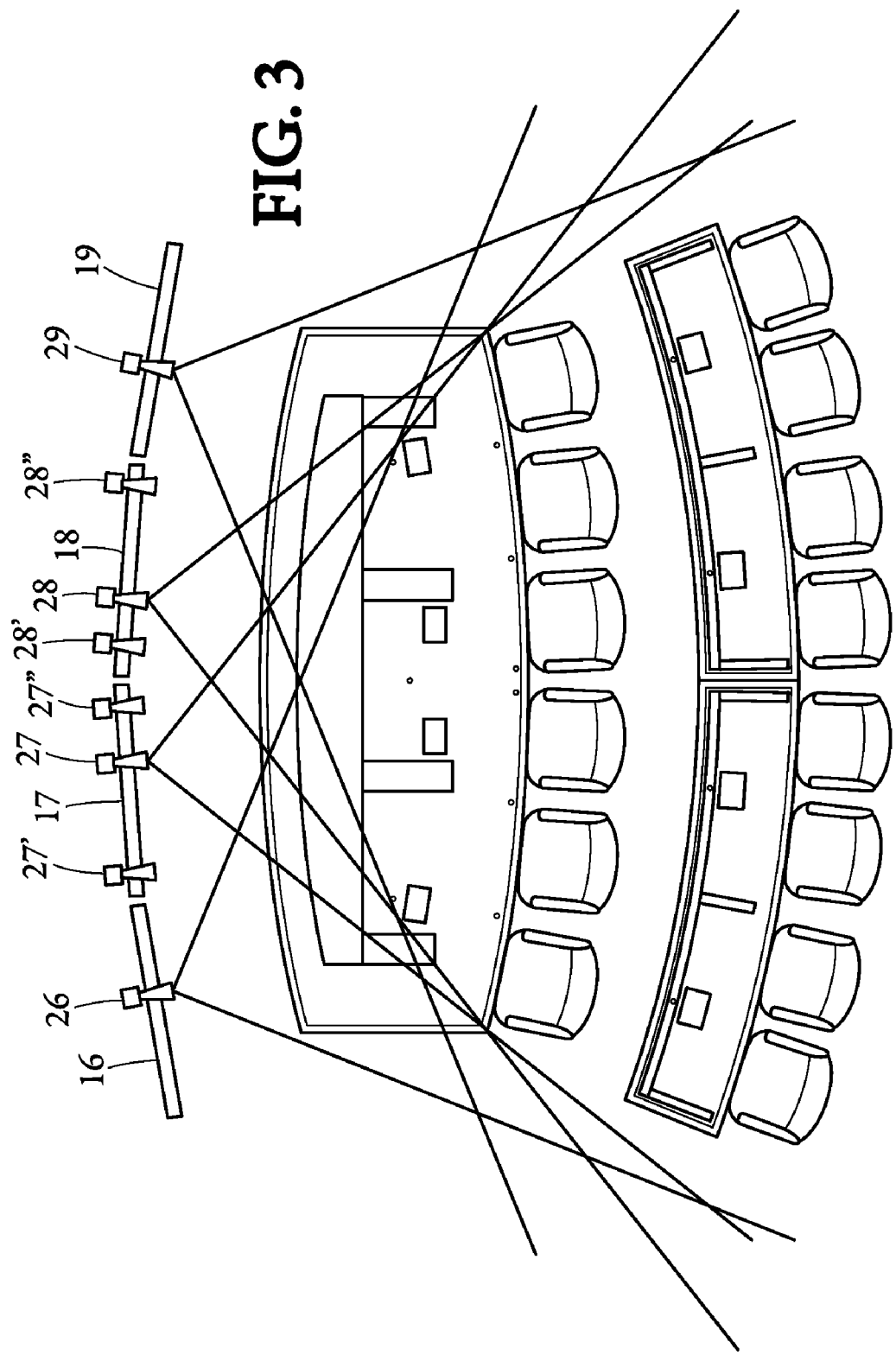

Referring to FIG. 3, each telepresence conference room preferably has one or more participant cameras 26, 27, 28, 29 for each participant display 16, 17, 18, 19 located on or close to the center of the top edge of an associated display. Certain rooms may have additional cameras, for example eight cameras and four displays, for use in particular modes of operation, such as the 'executive' mode described below. A room suitable for operation in 'Executive' mode may have four additional cameras 27', 27", 28', 28" located generally on the right and left sides of the top edges of the center displays 17, 18. In an 'Executive' room, the additional cameras 27', 27", 28', 28" may share equipment, such as codec equipment, with other cameras in the room. For example camera 26 and 27' may be connected to the same codec, since only one of the two cameras will be operational at any given time. Similarly, other camera pairs may also share codec equipment, such as cameras 27 and 27", 28' and 28, and 28" and 29.

Each participant camera is preferably assigned a position indicator in the system, for example 0, 1, 2 or 3, from left to right, for a 4-camera room, or 0, 1, 2, 3, 4, 5, 6 or 7, for an 8-camera room.

Each participant camera may be movably mounted to a linear or arcuate track that permits manual or motorized movement of the camera relative to a lateral (side-to-side) axis of the displays, or each camera may be fixed relative to the lateral axis of the displays. Further, each camera may include manual or motorized pan and tilt, to alter the optical axes of the camera, and manual or motorized zoom, to alter the optical field of vision of the camera (pan, tilt and zoom may be collectively referred to as PTZ).

Alternatively or additionally, each participant camera may be a large-format, high-resolution digital camera which is located in a fixed position relative to the lateral axis of the displays and which has fixed optical axes and a fixed (wide) optical field of vision. The images captured by such digital cameras may be digitally cropped as needed to select and optimize the images transmitted to and displayed at the remote conference rooms. Further, the optical field of vision of certain participant cameras may overlap, which provides redundancy for fault tolerance and which provides flexibility in the selection of camera angles.

The optical field of vision of each participant camera is preferably at least about 85 degrees to about 90 degrees in a horizontal direction and at least about 67 degrees in a vertical direction. Preferably there is a participant camera located on or nearly on the longitudinal axis 100 of the telepresence room (i.e., at the center-most position of the composite participant display), which camera has optical field of vision sufficient to capture an image of all participants seated at the conference table.

Conference Table & Seats

Preferably, the conference table 102 is substantially symmetrical about a longitudinal (front-to-back) axis 104 of the table, which lies on, or substantially on, the longitudinal axis 100 of the telepresence room. The facing edge of the table (which faces the participants) is curved or arcuate as viewed from above such that it is convex toward the participants. Specifically, the facing edge 106 has a center of curvature which lies on the longitudinal axis 104 of the table (and the telepresence room) and which lies substantially behind the participant displays.

The conference table 102 has a plurality of predetermined seating locations 108 (and associated chairs) located at predetermined locations disposed along the facing edge of the conference table. Preferably, each seating location 108 is delineated by visibly distinctive and/or tactile markings 110 on or adjacent the facing edge of the conference table 102. As depicted, there is preferably at least one such marking 110 between each seating position and at least one to the outside of the extreme left and right seating positions.

Alternatively or additionally, the markings 110 can include or consists of seating position lights, such as LEDs or the like, which are automatically illuminated to indicate the proper seating position for participants, as determined by the system. For example, if only two participants are present in a conference room having a table with eight seating locations, the system preferably illuminates the seating position lights associated with (i.e., between and on either side of) the two central seating locations located on either side of the longitudinal axis 104. Likewise, the system preferably indicates the desired seating location for all participants in a room.

The seating position lights are preferably connected to or controlled by seating position light control equipment located in the telepresence room or the site thereof. The seating position control equipment is activated by the control equipment (and computers) of the system operator during initiation of a telepresence conference. In particular, the configuration computers of the system operator determines the optimal and/or desirable seating positions for conference participants according to various criteria (such as the number of and configuration of the other rooms in the conference) and illuminates the appropriate seating position lights in each room at the start of the conference to guide the participants to the correct seating positions.

Conferences conducted using the system often relate to sensitive topics that must remain confidential. The markings 110 may also consist of or include privacy indictors such as lights or LEDs or the like, which are capable of displaying at least two distinct colors and/or appearances, such as Red and Green to indicate the current privacy status of the conference. The alternate color/appearance of the privacy indicator markings 110 is intended to indicate to the teleconference participants whether the conference is in private mode where the audio and video signals are excluded from monitoring by any central conference or network management personnel, such as at a Network Operations Center (NOC). In particular, the privacy indicators may glow red during initial set-up of the conference (or when the assistance of conference management personnel is requested to modify the conference or solve a technical problem) to indicate that the conference is in public mode. However, if conference privacy has been requested or selected by one of the conference participants, when the conference has been successfully initiated and conference management personnel no longer have access to the video and audio streams, the privacy indicators may glow green to indicate that the conference is in private mode. As can be appreciated, the privacy indicators provide a convenient and readily discernible indicator to all participants as to the current privacy status of the call. Preferably, the privacy indicators in a particular room (or all rooms) are synchronized such that they all indicate the same status at any given time.

The privacy indicators are preferably connected to privacy indicator actuation equipment at the site of each telepresence room, such as a special purpose computer (or general purpose computer with special programming) suitable to actuate (e.g., change the color and/or appearance) of the privacy indicators in response to a command. The privacy indicator actuation equipment is connected to or accessible by the Network Operation Center. Preferably, the system includes a privacy control which selectively prevents personnel of the Network Operation Center from accessing audio and video streams when users of the system desire or select the conference to be in private mode, and which selectively permit the NOC personnel to access the streams when users of the system do not desire privacy (i.e., when the conference is in public mode). The privacy control may be located in the Network Operation Center. Additionally or alternatively, the privacy control may be present in (or only in) one or more of the rooms in the conference such that the users of the conference have direct and convenient (and optionally exclusive) access to the privacy controls. Preferably, the system automatically directs the privacy indicator actuation in each room in the conference to indicate the current privacy status of the call, in response to receipt of a command via the privacy control. Where part of the privacy control is located in a room or site participating in the conference and the conference is in privacy mode, the system preferably monitors or polls such room-based privacy control on a regular or periodic basis to determine whether the privacy control responds with an indication that the conference is (still) in privacy mode. If the privacy control responds that the conference is no longer in privacy mode (i.e., has been switched to public mode), or if the privacy control fails to respond within a predetermined period of time (e.g., 1-60 seconds), the system preferably switches the conference out of private mode and into public mode.

The privacy control preferably includes a special purpose computer (or a general purpose computer with special programming) suitable to receive an instruction from a human user or operator to activate or deactivate privacy, to selectively isolate or connect NOC personnel to the audio and video streams of a conference, and to issue appropriate commands to the privacy indicator actuation equipment located at the sites of the rooms in the conference.

Preferably, there are an even number of participant seats 108 at the conference table (e.g., 4, 6, 8, 10, etc.), and the seats are arranged symmetrically on either side of the longitudinal axis of the table. Each participant seat is preferably allocated a predetermined and substantially equivalent amount of space (about 30" or about 762 mm), with an additional separation buffer between the two center-most participant seats located on either side of the longitudinal axis of the table (about 6" or about 153 cm). Thus, the minimum lateral dimension (length) of the table is dictated by the number of participant seats at the table. For example, a 4-participant telepresence conference table would have a lateral dimension of greater than or equal to about 126" (4×30"+6", or about 3200 mm).

The table 102 is positioned relative to the participant displays 16, 17, 18, 19 such that a facing edge distance (as defined by the distance between the facing edge of the table and the center-most position of the participant displays, measured along the longitudinal axis of the telepresence room) is sufficient to permit a single participant camera located at the center-most position of the composite participant display and having a horizontal optical field of vision of about 85 degrees to about 90 degrees to capture a complete image of the conference table, including a maximum number of participants seated at the conference table. Preferably, the facing edge distance is not substantially greater than the minimum distance necessary and is at least within 10 or 20 percent of the minimum distance. Thus, for example, for conference tables having maximum seated participants of 4, 6, 8 and 10 persons, the minimum facing edge distance would preferably be about 8 ft (2.5 m), about 10 ft (3 m), about 12.5 ft (3.8 m), and about 17 ft (5.2 m), respectively.

It is preferably that the conference table 102 (and especially the top surface 112 of the table) have a substantially solid, light color (such as maple or another light wood color), without substantial multiple coloring or substantial visible wood grains, and should minimize light and sound reflections.

For telepresence rooms accommodating 12 or more participants (e.g., 12, 16, 18, 20 participants, etc.), the seating is preferably divided in half with the first "row" of seating being located at the first (or primary) conference table 102 and a second row being located in a second tier of seating at a second conference table 116. As with the first conference table, the second conference table has predetermined seating locations and seating markings, and has an arcuate facing edge 106 which is convex (as viewed from above) toward the participants in the second tier. The opposite edge 118 of the second conference table (facing the participants seated at the first conference table) is preferably concave toward the facing edge of the first conference table such that there is a substantially consistent distance between the opposite edge of the second conference table and the facing edge of the first conference table. Preferably, such distance is between about 1 m and about 2 m such that participants seated at the first conference table have sufficient room to access their seats and to maneuver their chairs as desired.

Alternative Presentation Displays

The telepresence room may include an alternative presentation display 120, such as a display for a laptop computer or DVD presentation. Such alternative presentation display 120 is preferably mounted to one of the walls 122 adjacent one of the lateral sides of the conference table 102, or to a support adjacent one of the lateral sides of the conference table. Preferably, the bottom of the alternative presentation display is sufficiently high to permit participants seated at the far end of the conference table to view the entire active portion of the alternative presentation display, anticipating that the conference table will often be populated with other participant's laptops. It has been found that a suitable distance from the floor for the active display portion of alternative presentation displays is about 40" (1 m) off of the floor.

Audio & Acoustics

Preferably, a plurality of cardioid, mini-boundary participant microphones are permanently installed in the top surface of the conference table to capture conversations between the conference participants. The microphones preferably have a small "footprint" of about 1" (radius) and project upward from the top surface of the table a short distance of less than about one-half inch (½"), such that the microphones are inconspicuous. The microphones are located on or near a lateral (side-to-side) center axis of the conference table at substantially equal intervals along the lateral axis such that the distance between any seated participant and the nearest microphone is between about 20" (58.8 cm) and about 30" (76.2 cm). Preferably, the microphones have a sufficient sensitivity and fidelity to capture normal-volume conversations within such range (i.e., about 60 dB sensitivity).

Further, each telepresence room includes a plurality of speakers, preferably located behind or adjacent each of the participant displays. Preferably there is a speaker for each individual participant display in the composite participant display, and each speaker is located in above or below one of the individual participant displays (and preferably in close proximity), such that there is a one-to-one association of speakers to individual participant displays. As will be discussed in further detail below, the audio and video signals from each remote telepresence room are reproduced/displayed at similar locations to enhance the approximation of an in-person conference. Preferably, each participant speaker is assigned a position indicator in the system, for example a number 0, 1, 2 or 3, from left to right facing the participant displays, which corresponds to, and is preferably the same as, the position indicator of an associated participant display and camera pair. For example, participant speaker '0' is associated with participant display '0' and participant camera '0', and so on.

Preferably, the system includes audio processing electronics to minimize or eliminate undesirable audio effects (such as echoes and feedback) produced in the room, which electronics may be located at each telepresence site and/or at a central location. To minimize such undesirable audio effects, the acoustics of the room should be designed such that the room has a Noise Criteria of less than or equal to about 35. To achieve the desired acoustics, at least one of any two parallel hard surfaces (such as the conference table top and the ceiling, or parallel walls) should be acoustically treated.

Lighting

Preferably, the lighting at each telepresence room is controlled remotely by the telepresence system, such as with wireless (e.g., infra-red) controls, low voltage relay closures, Telnet sessions and/or RS232/422/485, or other suitable means. Preferably, the intensity of the lighting is evenly distributed throughout the portions of the room that are to be captured on video by the cameras, including the participants, the table, the back wall and up to 50% of both side walls.

Teleconference Control

Figure 9:
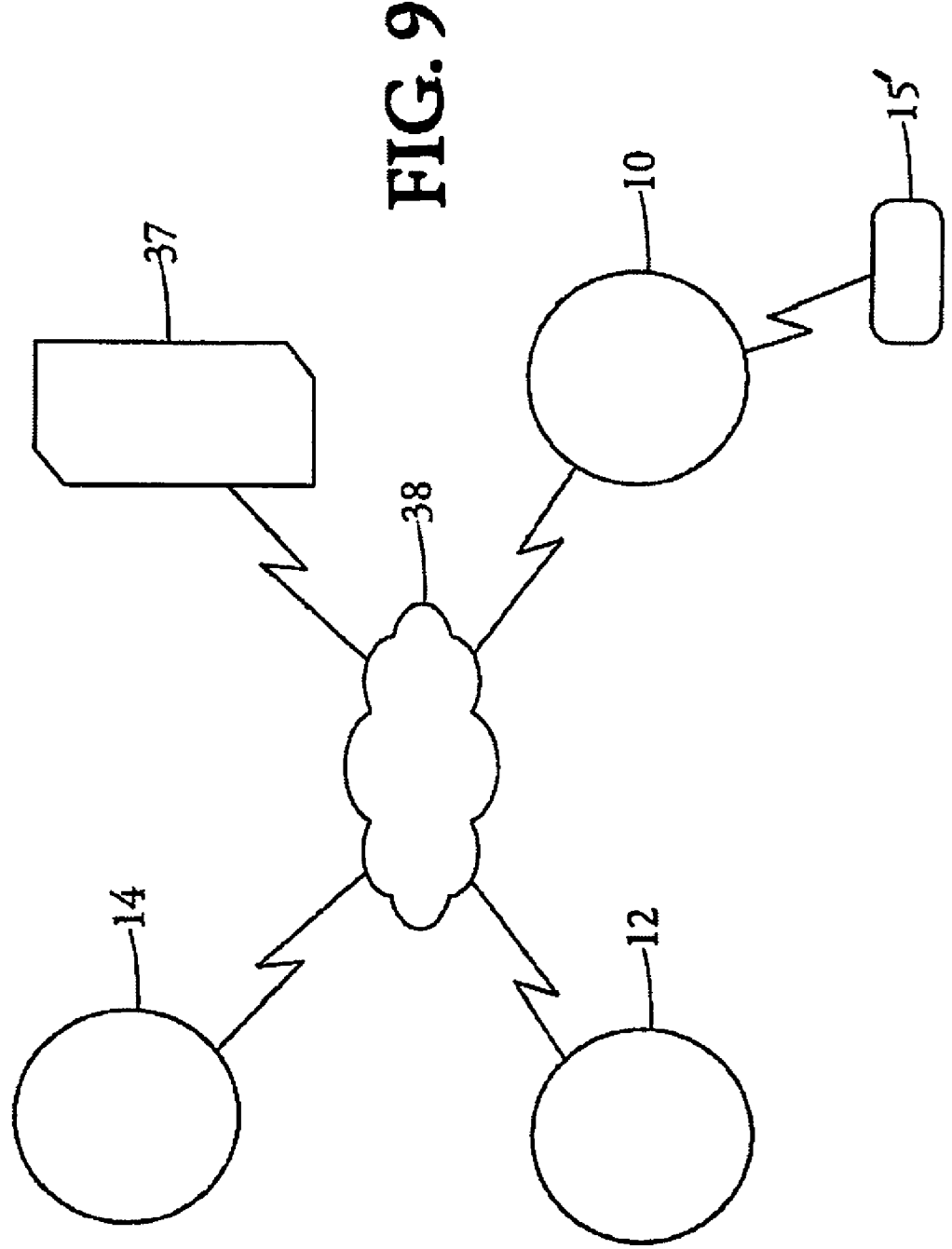
FIG. 9 is a schematic of a telepresence conference network.

Referring to FIG. 9, a telepresence conference may include a plurality of telepresence rooms/sites 10, 12, 14 and an LVC room 15', connected to a bridge telepresence room, such as telepresence room 10.

The telepresence conferencing equipment at each telepresence site 10, 12, 14 is preferably connected to a system operator 37 via a private or public network 38, such as the Internet. Preferably there exists alternate connections between the system operator 37 and each telepresence site 10, 12, 14, such as via dial-up modem connections and/or ordinary telephone connections (not shown). One of the telepresence rooms 10 may be a bridge to an LVC room 15', such that the other telepresence rooms 12, 14 in the conference connect to the LVC room 15' through the bridge telepresence room 10.

The system operator 37 preferably is preferably located at a (single) central location (site) and includes a Network Operations Center (NOC). The system operator includes several general purpose and special purpose computers (running autonomously and/or at the direction and control of human operators) which computers are operable to determine the proper or optimal configuration for a teleconference and to remotely configure, interconnect and manage teleconference equipment, including the temporary interconnection of teleconference equipment located in each telepresence room and/or at the site of the system operator.

Figure 10:
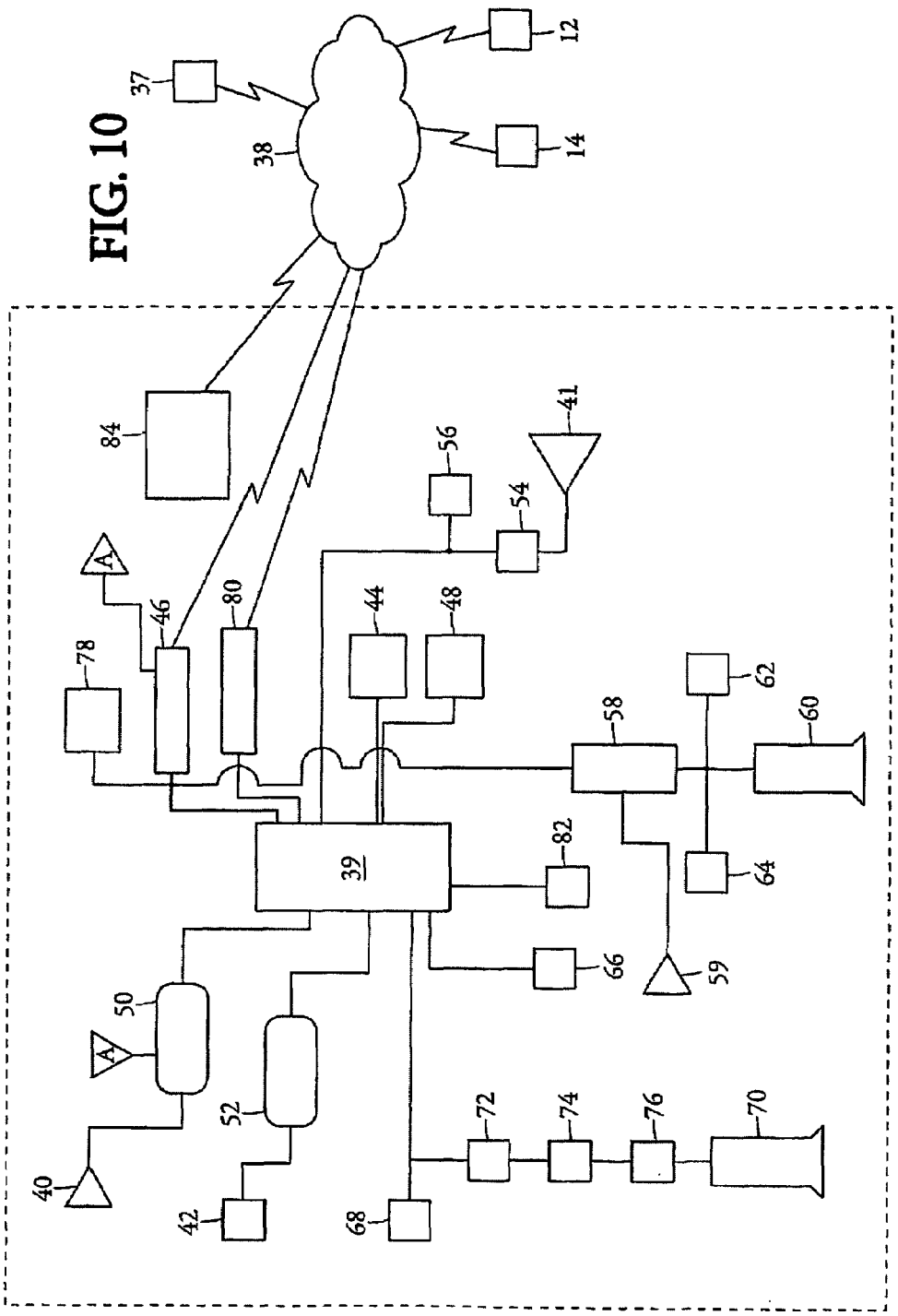
FIG. 10 is schematic of a telepresence site constructed in accordance with the invention.

Referring to FIG. 10, at the heart of each telepresence site is a remotely-configurable 16×16 Audio/Video matrix switch 39, which is connected to the network 38 and to which most other devices at the telepresence site are connected.

Each telepresence site also preferably includes:
a plurality (e.g., four) of each of participant microphones 40, participant speakers 41, audio/video codecs 46, participant cameras 42, and participant displays 44 (the participant cameras and displays being in pairs), where each is connected to the 16×16 A/V matrix switch 39 (either directly or indirectly through other equipment) and where the A/V codecs 46 are connected to the network 38;
each codec is preferably assigned a (logical) position indicator in the system, for example 0, 1, 2 and 3 (see FIG. 8), which corresponds to the position indicator of the set of participant camera, participant display and participant speaker to which the codec is connected;
if the participant displays and/or cameras are digital, they and the video ports of the codecs are connected to the 16×16 digital video matrix switch;
an alternate presentation display 48 connected to the 16×16 A/V matrix switch 39;
a mutli-channel audio processing unit 50 connected intermediate the participant microphones 40 and the 16×16 A/V matrix switch 39 and connected to the A/V codecs 46 (where the audio signals of the A/V codecs 46 are sent to a reference bus of the audio processing unit such that they are used as echo canceling reference signals);
a multi-channel (e.g., 4-channel) audio amplifier 54 connected intermediate the participant speakers 41 and the 16×16 A/V matrix switch;
a plurality of (e.g., four) audio alarm relays 56 connected intermediate the multi-channel audio amplifier 54 and the 16×16 A/V matrix switch 39;
an 8×1 diagnostic switch 58 having a plurality (e.g., four) incoming connections from the 16×16 A/V matrix switch 39;
a diagnostic microphone 59 (or alternatively or additionally a signal from one of the participant microphones 40 prior to the audio processing unit 50) connected to an input of the 8×1 diagnostic switch 58;
an audio server 60 connected to an output of the 8×1 diagnostic switch 58;
an audio alarm relay 62 connected intermediate the audio server 60 and the 8×1 diagnostic switch 58;
a audio meter graphic generator 64 connected intermediate the audio server 60 and the 8×1 diagnostic switch 58;
a diagnostic test tone generator 66 (e.g, an oscillator) connected to the 16×16 A/V matrix switch 39;
a room view camera 68 connected to the 16×16 A/V matrix switch 39;
a single-source video server 70 connected to the room view camera 68 and to the 16×16 A/V matrix switch 39;
a multi-source video server 78 (e.g., four-source video server) connected to each of the audio/video codecs 46;
an LVC codec 80 connected to the 16×16 A/V matrix switch 39;
an audio program playback device 82 connected to 16×16 A/V matrix switch 39; and
an integrated control system 84.

Telepresence Conference Dynamic Scenario Manager

The configuration of telepresence conferences can encompass a very large number of permutations depending on factors such as the number of participating conference rooms, the number of participants in each room and the number of individual participant displays in each room. The telepresence system employs a scenario algorithm to dynamically determine the optimal configuration for the telepresence conference for any given set of variable parameters, and which automatically generates and transmits configuration instructions to the various components of the telepresence system to set up and initiate the conference.

Certain characteristics are predetermined and known to the telepresence system, such as the identities of the telepresence rooms within a group of telepresence rooms that may be interconnected via the system, the number of participant cameras and participant displays in each of those rooms, and the presence or absence of any alternative presentation displays.

To configure a telepresence conference, a user (or an operator) enters certain conference-variable data into a terminal connected to the telepresence system, such as the name of the owner/customer of the group of interconnectable telepresence rooms, a list the rooms to be connected in the conference, the number of people in each room, the desired number of video streams to use in the conference, the identity of the room from which an alternate presentation will start (if any), the type of such alternate presentation (e.g., VGA-laptop or DVD-video), the identity of the LVC bridge room (if a Legacy Video Conference—ISDN system is in the conference), the date & time to initiate the conference, and the duration or time to terminate the conference. Preferably, such conference-valiable data may be entered via a computer connected to a host computer system via a local area network (LAN) and/or a wide area network (WAN), such as the Internet or a private network.

The scenario algorithm of the telepresence system eliminates the heretofore laborious and costly process of manually referencing and entering conference configuration connection into the telepresence system.

A particular benefit of the present system is the ability to handle a wide variety of room configurations with equal or differing numbers of cameras and displays. Further, the system is able to accommodate different modes of operation for each room. The system employs a plurality of pre-defined room configurations for each room type, for several possible variations in telepresence call scenarios. New room types and scenarios can be rapidly added to the system as desired by adding new pre-defined room configurations, without the need to re-write the primary software for the system. In particular, new room types may be added with D displays and C cameras (where D and C may or may not be equal) without changing any code, just by adding configurations for the new room types. Further, new operation modes can be added without changing code. And, the invention contemplates the use of a graphical user interface to facilitate the addition and modification of configurations for room types.

System Initialization (Determination and Input of Optimal Behavior of Rooms)

Prior to configuration of a teleconference, certain configuration data is entered into the system to allow the system to determine optimal configurations for the various teleconference scenarios.

Configuration factors that influence proper vectoring in a telepresence conference include: (a) the number of telepresence rooms in the conference, (b) for each telepresence room in the conference: (1) the number of active (i.e., working) participant displays, (2) the number of active participant cameras, and (3) the number of participants, (c) the number of LVC conferences in the conference (if any), (d) the maximum desired streams between any two telepresence rooms in the conference, as either selected by the user or the system, and (e) the operation mode, which can be any one of a number of pre-defined operation modes.

There is a room type defined for each unique combination of active participant displays and active participant cameras. Room types are preferably stored in a room_type table as set forth in Table A below. As can be appreciated, the system preferably has a plurality of pre-determined room types (e.g., 7 room types). However, room types may be added or removed from the system by adding or removing room types from the room_type table.

TABLE A

| Room_Type_ID | No. of Active Displays | No. of Active Cameras |
|---|---|---|
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 4 | 8 |

The operation modes are also pre-defined by the system and are stored in a operation_mode table as set forth in Table B below. As with room types, the system preferably has a plurality of pre-determined operation modes (e.g., 2). However operation modes may be added or removed from the system by adding or removing operation modes from the operation_mode table.

TABLE B

| Mode_ID | Mode Description |
|---|---|
| 1 | Normal |
| 2 | Executive |

Every room type has at least one configuration, which defines how connections are made with the room and other rooms in the call. The configurations are stored in one or more configurations tables as set forth in Tables C, D, E and F below.

Figure 4:
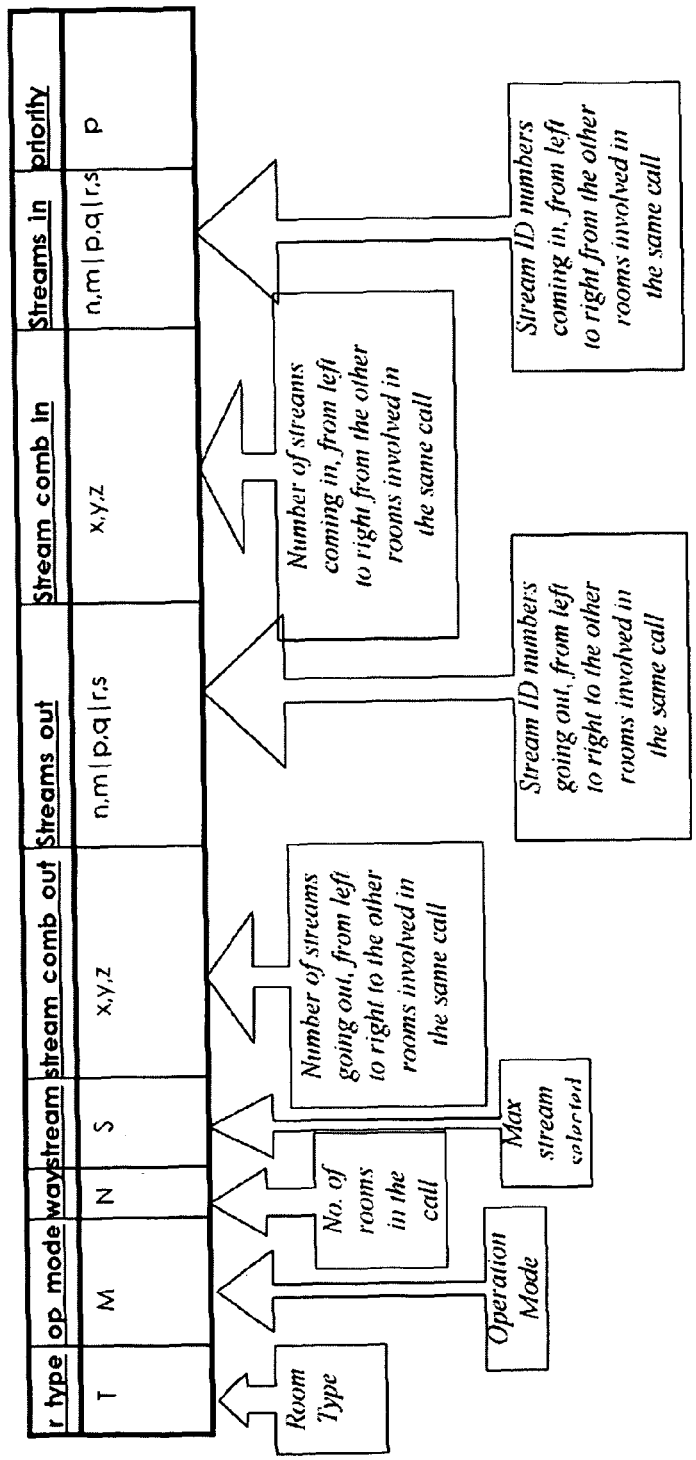
FIG. 4 is a schematic representation of a configuration table employed by the system.

FIG. 4 depicts a schematic representation of a record in a configuration table. Each record in a configuration table includes fields representing:

a room type value (r_type)

an operation mode value (op_mode)

a value indicating the total number of rooms in the call, including any LCV conferences (way)

the maximum number of streams between any two telepresence rooms in the call (stream)

the number of out-going streams to other telepresence rooms in the call, from left to right (streams_comb_out)

the out-going stream ID numbers assigned to the other rooms, from left to right, where "0" is the left-most stream (streams_out)

the number of incoming streams from other telepresence rooms in the call, from left to right (streams_comb_in)

the incoming stream ID numbers assigned to the other rooms, from left to right (streams_in)

the priority of the configuration with respect to other pre-defined configurations for the same combination of room type+operation mode+number of rooms in the call+maximum number of streams As will be discussed in detail below, the priority value of each configuration among a group of configurations for the same combination of configuration factors (room type+operation mode+number of rooms in the call+maximum number of streams) is used by the system to determine the best configuration to use in a telepresence conference. Generally, a priority value of '0' indicates a best configuration and a priority value of '1' indicates a second best configuration.

Table C below shows a configuration table for room type 1, which by definition has one active display and one active camera. The record has a room type value of 1 and the operation mode has a value of 1 indicating that in this configuration the room is operating in 'normal' mode. The "way" value is 2 because this room type can only participate in a conference having 2 rooms. The maximum stream value can only be 1 because room type 1 has only one camera. The stream_comb_out value is simply 1 because there is one stream going to the only other room in the call. The "streams_out" value is "0" because the stream from the left-most (and only) camera is assigned to the first (and only) other room in the call. Likewise, the "streams_comb_in" and "streams_in" values are simply 1 and 0, respectively, because there is only 1 incoming video stream and that video stream is displayed on the only participant display, which is identified with position indicator '0'. Lastly, the priority of this configuration is "0" indicating a best configuration. Indeed, there are no other available configurations for this room. However, as will be seen below, the priority value is employed where several configuration are available.

TABLE C

| r type | op mode | way | stream | stream comb out | streams out | stream comb in | streams in | priority |
|---|---|---|---|---|---|---|---|---|
| 1 | 1 | 2 | 1 | 1 | 0 | 1 | 0 | 0 |

Table D below shows a configuration table for a room type 2, which by definition has two active displays and two active cameras. As with room type 1, room type 2 only has configurations to operate in the 'normal' mode of operation. Therefore, there are three possible configuration scenarios for room type 2. The first two configurations are for two room conferences where the maximum streams is set to 1 and 2, respectively. The third configuration is for a 3-room conference where the maximum streams is set to 1. As with the configuration for room type 1, there is only one configuration for each unique combination of configuration factors (room type+operation mode+number of rooms in the call+maximum number of streams). Therefore, the priority of each configuration is "0."

TABLE D

| r type | op mode | way | stream | stream comb out | streams out | stream comb in | streams in | priority |
|---|---|---|---|---|---|---|---|---|
| 2 | 1 | 2 | 1 | 1 | 0 | 1 | 0 | 0 |
| 2 | 1 | 2 | 2 | 2 | 0, 1 | 2 | 0, 1 | 0 |
| 2 | 1 | 3 | 1 | 1, 1 | 0\|1 | 1, 1 | 0\|1 | 0 |

Table E below shows a configuration table for a room type 3, which by definition has 3 displays and 3 cameras. As above, a room of type 3 can operate in 'normal' mode, therefore the r_type and op_mode for configurations in this table are 3, and 1, respectively. Room type 3 may participate in calls having 2, 3 or 4 rooms, and with various maximum stream settings. Therefore, there are seven possible configurations for room type 3. The fifth and sixth configurations for room type 3 are the only configurations that have the same configuration factors (room type+operation mode+number of rooms in the call+maximum number of streams). The priority value for the fifth configuration is '0' because this configuration is the best for this combination of configuration factors. The sixth configuration has a different distribution of video streams between the other rooms in the call, which is less optimal than the distribution in the fifth configuration. Therefore, the sixth configuration has a priority value of '1' to indicate that, out of the two configuration, the fifth configuration is preferable over the sixth. As described below, the system employs the priority value to obtain the most preferable configuration feasible for a conference.

Table F below shows a configuration table for a room type 7, which by definition has 4 displays and 8 cameras. Room type 7 has configurations above for both 'Normal' and 'Executive' modes therefore, there is a set of configurations for room type 7 for op_mode value of '1' and another set of configurations for an op_mode value of '2.' As with the configuration table for room type 3, for several combinations of configuration factors (room type+operation mode+number of rooms in the call+maximum number of streams) there are several possible configurations, each of which is given a different priority value. For example, the sixth, seventh and eighth configurations in Table F have the same configuration factors, and have priority values of "0", "1", and "2," respectively, which indicate that of the three configurations, the sixth configuration is most preferable, and the seventh configuration is more preferable than the eighth configuration.

TABLE E

| r type | op mode | way | stream | stream comb out | streams out | stream comb in | streams in | priority |
|---|---|---|---|---|---|---|---|---|
| 3 | 1 | 2 | 1 | 1 | 1 | 1 | 1 | 0 |
| 3 | 1 | 2 | 2 | 2 | 0, 1 | 2 | 0, 1 | 0 |
| 3 | 1 | 2 | 3 | 3 | 0, 1, 2 | 3 | 0, 1, 2 | 0 |
| 3 | 1 | 3 | 1 | 1, 1 | 0\|1 | 1, 1 | 0\|1 | 0 |
| 3 | 1 | 3 | 2 | 2, 1 | 0, 1\|2 | 2, 1 | 0, 1\|2 | 0 |
| 3 | 1 | 3 | 2 | 1, 2 | 0\|1, 2 | 1, 2 | 0\|1, 2 | 1 |
| 3 | 1 | 4 | 1 | 1, 1, 1 | 0\|1\|2 | 1, 1, 1 | 0\|1\|2 | 0 |

TABLE F

| r type | op mode | way | stream | stream comb out | streams out | stream comb in | streams in | priority |
|---|---|---|---|---|---|---|---|---|
| 7 | 1 | 2 | 1 | 1 | 2 | 1 | 1 | 0 |
| 7 | 1 | 2 | 2 | 2 | 3, 4 | 2 | 1, 2 | 0 |
| 7 | 1 | 2 | 3 | 3 | 1, 2, 3 | 3 | 0, 1, 2 | 0 |
| 7 | 1 | 2 | 4 | 4 | 2, 3, 4, 5 | 4 | 0, 1, 2, 3 | 0 |
| 7 | 1 | 3 | 1 | 1, 1 | 2\|5 | 1, 1 | 1\|2 | 0 |
| 7 | 1 | 3 | 2 | 2, 2 | 0, 1\|6, 7 | 2, 2 | 0, 1\|2, 3 | 0 |
| 7 | 1 | 3 | 2 | 2, 1 | 0, 2\|5 | 2, 1 | 0, 1\|2 | 1 |
| 7 | 1 | 3 | 2 | 1, 2 | 0\|1, 2 | 1, 2 | 0\|1, 2 | 2 |
| 7 | 1 | 3 | 3 | 3, 1 | 2, 3, 4\|5 | 3, 1 | 0, 1, 2\|3 | 0 |
| 7 | 1 | 3 | 3 | 1, 3 | 2\|3, 4, 5 | 1, 3 | 0\|1, 2, 3 | 1 |
| 7 | 1 | 4 | 1 | 1, 1, 1 | 0\|1\|2 | 1, 1, 1 | 0\|1\|2 | 0 |
| 7 | 1 | 4 | 2 | 1, 2, 1 | 0\|1, 6\|7 | 1, 2, 1 | 0\|1, 2\|3 | 0 |
| 7 | 1 | 4 | 2 | 2, 1, 1 | 2, 3\|4\|5 | 2, 1, 1 | 0, 1\|2\|3 | 1 |
| 7 | 1 | 4 | 2 | 1, 1, 2 | 2\|3\|4, 5 | 1, 1, 2 | 0\|1\|2, 3 | 2 |
| 7 | 1 | 5 | 1 | 1, 1, 1, 1 | 2\|3\|4\|5 | 1, 1, 1, 1 | 0\|1\|2\|3 | 0 |
| 7 | 2 | 3 | X | 3, 3 | 1, 2, 3\|4, 5, 6 | 1, 1 | 1\|2 | 0 |
| 7 | 2 | 3 | X | 1, 1 | 0\|5 | 1, 3 | 0\|1, 2, 3 | 1 |
| 7 | 2 | 3 | X | 1, 1 | 2\|7 | 3, 1 | 0, 1, 2\|3 | 2 |

As described above, the "streams_out" field of the configuration table indicates the position indicator (i.e., Stream ID) of each participant camera connected to another room in the conference. As set forth above, such position indicators may be, for example, 0, 1, 2 or 3 for an 4-camera room, or 0, 1, 2, 3, 4 or 7 for an 8-camera room. Further, the "streams_out" field also indicates to which other room each participant camera is connected, based on a relative position of the room in a sorted order of rooms (the process of sorting the rooms is described below and involves prioritizing and positioning the rooms with respect to one another). For example, the "streams_out" value in row 11 of Table F above is "0|1|2" which indicates that participant camera in position '0' (i.e., the left-most camera) is connected to the next room in the sorted order of rooms after the room being configured with the settings in row 11. Further, camera '1' is connected to the following room in the sorted order and camera '2' is connected to the next following room in the sorted order. In this process, the sorted order is considered a closed loop. For example, for the last room in the sorted order, the "next" room in the sorted order is the first room in the sorted order, and so on. As can be appreciated, a non-numerical delineator, such as the vertical line "|" depicted, may be used to indicate the "next" room in the sorted order of rooms. Another non-numerical delineator, such as a comma ",", may be used to indicate multiple stream assignments to a particular room.

Similarly, the "streams_in" field of the configuration table indicates the position indicator (i.e., Stream ID, e.g., 0, 1, 2 or 3) of each participant display connected to another room in the conference. As above, the "streams_in" field also indicates to which other room each participant display is connected, based on a relative position of the room in the sorted order rooms. The "streams_in" value in row 11 of Table F above is "0|1|2" which indicates that participant display in position '0' (i.e., the left-most camera) is connected to the next room in the sorted order of rooms after room being configured with the settings in row 11. Further, display '1' is connected to following room in the sorted order and display '2' is connected to the next following room in the sorted order.

A substantial feature and benefit of the present system is the use of the configuration tables such as those above to specify the connections between rooms in a conference because the configuration tables provide an effective means to specify the relative preference among the several configurations and the configuration tables can be efficiently supplemented or modified as new room types and/or operation modes are added or modified, and the preferences among several configurations can be easily modified by changing the priority value in the configuration tables.

The use of configuration tables such as described above does require some initial determinations. However such initial determinations do not require the system operator to determine the configuration settings for all possible conferences. The initial determinations include: (a) predetermining, for every room type, at least one and preferably a plurality of unique, feasible combinations of configuration factors (i.e., operation mode+number of rooms in the call+maximum number of streams), (b) predetermining, for each pre-determined unique, feasible combination of configuration factors, at least one and preferably a plurality of unique, feasible permutations of the number of streams that can be distributed to and received from every other room in the call, (c) predetermining, for every unique, feasible permutation of the number of streams that can be distributed to and received from every other room in the call, stream IDs to be distributed to and received from every other room in the call (where a stream ID designates a relative position in which an associated participant camera/display pair is located in a composite participant display, for example in position 0, 1, 2 or 3, from left-to-light), (d) predetermining, for each unique combination of configuration factors (as determined in (a)) having more than one set of the number of streams that can be distributed to and received from every other room in the call (as determined in (b))+stream IDs to be distributed to and received from every other room in the call (as determined in (c)), a relative preference of each set, (for example with such preferences being indicated on a numerical scale, with 0 indicating most preferable, and 1 and 2 indicating successively lesser preference).

For example, the configuration table for a room of type 3 as set forth in Table E above has 7 rows of feasible configurations. The initial determinations, as determined in (a) above for this room type in result in 6 unique, feasible combinations of configuration factors (i.e., operation mode+number of rooms in the call+maximum number of streams). For each of the unique combination of configuration factors in rows 1-4 and 7, there is only one set of the number of streams that can be distributed to and received from every other room in the call (as determined in (b))+stream IDs to be distributed to and received from every other room in the call (as determined in (c)). Therefore, as determined in (d), the priority value for each of these rows is '0', indicating a most preferable configuration, which in this case is the only feasible configuration. The combination of configuration factors in row 5 is duplicated in row 6 because, for this combination of configuration factors, there exist two feasible configurations. The configuration of row 5 is more preferable than the configuration of row 6. Therefore, the relative preferences of rows 5 and 6 are set to '0' and '1', respectively to indicate that row 5 is more preferable.

Participant Camera/Display Pair Assignments

The determinations of the Stream IDs to distribute to and from other rooms in the conference are chosen to achieve realistic (virtual) eye contact. To achieve or maximize realistic virtual eye contact among all the participants of the conference, the system connects the participant displays and cameras of each pair to the same remote room.

Generally, the participant display/camera pairs in the highest sorted telepresence room are assigned to the other rooms in the conference beginning from one side (e.g., from left-to-right), in the sorted order of the other rooms in the conference. Thus, generally, the left-most participant display/camera pairs(s) in the highest sorted room will be assigned to the second-highest sorted telepresence room, and so on.

To further enhance the virtual eye contact among the participants of the conference, the system preferably connects the left-most active participant display/camera pair(s) (and associated codecs) in a given telepresence room to the right-most active participant display/camera pair(s) (and associated codecs) in the next lower-sorted telepresence room. Further, the left-most active participant display/camera pair(s) (and associated codecs) in the lowest-sorted telepresence room are preferably connected to the right-most active participant display/camera pair(s) (and associated codecs) in the highest-sorted telepresence room. Subsequent assignment of unassigned participant display/camera pairs in each telepresence room is preferably performed from left to right in order of priority of the lower-sorted rooms.

If such assignments (for example the assignment between the lowest-sorted telepresence room and the highest-sorted telepresence room) would result in an unassigned participant display/camera pair between two assigned participant display/camera pairs, the system preferably alters (e.g., shifts) the assignments such that there exists no unassigned participant display/camera pairs between two assigned pairs.

Initiation of a Teleconference

To initiate a telepresence conference, the user or operator first enters certain parameters into the system, including:
1. The customer name;
2. The particular customer rooms to be connected;
3. The number of participants in each room;
4. The identify of a room from which the alternate presentation will start (if any) and the type of alternate presentation (e.g., VGA Laptop and/or DVD Video, etc.); and
5. The identity of any LVC (ISDN) bridge rooms, if any LVC systems are to be connected to the conference.
6. The maximum desired number of streams between any two room.
7. The date & time to initiate the conference, and the duration or time to terminate the conference.

Determination of Maximum Number of Streams Between Any Two Rooms

With respect to the user input of the maximum desired number of streams between any two rooms, the system preferably provides a drop-down list having values of 1 to an absolute maximum number of streams (Xmax), where Xmax is the most streams that may be configured between two rooms in the desired conference. The system also preferably determines a default value for an optimal number of streams between the rooms, which is used unless the user overrides the default value by picking another value in the drop-down list.

To determine the absolute maximum number streams (Xmax), the system preferably employs an algorithm to determine the maximum streams that each room may receive, sorts each value in descending order and then chooses the $2^{nd}$ greatest value.

A first step in this algorithm may be represented by the following:
FOR ALL ROOMS [1. . . N]

$$Xn=Sn-(N-c);\quad\text{Formula A}$$

where c=1 if LVC=1, or c=2 if LVC=0
or if LVC>1, c=2−Number of LVC
OR $$Xn=(Sn-LCV)-(N-2)\quad\text{Formula B}$$

Where LVC=Number of LVC present
END FOR
Where N=number of rooms involved in the call. (N must be equal to or greater than 2)
Sn=Number of active (i.e., working) screens in room 'n' where 'n' is a number between 1 to N.
Xn=Absolute maximum number of incoming streams for room 'n'.
c=An integer as defined above
LVC=Number of LVC conferences in the call
(Note: A single LVC conference may include participants from several sites, however, each LCV conference is considered one LVC conference for purposes of this telepresence system because each LVC conference requires exactly one display in each telepresence room)

In the second step of the algorithm, the system sorts the list of Xn in descending order (highest-to-lowest). Next, the system select the $2^{nd}$ element ($2^{nd}$ greatest) in the sorted list as (Xmax). Thus, the drop-down list will present possible "max" streams from 1 to Xmax For example, in a 2-way where one room has 4 displays and the other has 3 displays, the maximum incoming stream values for each room will be X1=4 and X2=3, and the sorted list is {4, 3}. A 4 stream call is possible for the first room. However, only a 3 stream call is possible for second room, hence the second value 3 is the maximum number of streams between the two rooms.

For a 3-way call with 3 rooms having 4 displays in the first room, 3 displays in the second room, and 2 displays in the third room, the sorted list will be {3, 2, 1}. A 3-way call would never be possible because only the first room can handle 3 extra streams, hence the second largest value 2 will be the maximum possible stream value.

For purposes of this determination, the sorted list may contain duplicate values. In other words, duplicate values are not removed from the sorted list for this procedure. However, duplicate values are preferably removed from the drop-down list presented to the user, as described below. For example, for a 3-way call between 3 rooms, where the first and second rooms have four displays and the third room has 2 displays, the sorted list would be {3,3,1}. The second value is 3 which is the correct possible maximum value for max-stream number.

It is important to note that the maximum possible number of streams between any two rooms (Xmax) is not necessarily the highest stream value common to all rooms, which is called optimal (or default) maximum stream value. The algorithm to determine the optimal maximum stream first determines the number of displays in the room having the least number of displays, and then determines how many streams that room can receive from each other (non-LVC) room in the call.

Specifically, in a first step, the system steps through each room in conference, to determine the room with least number of displays, and stores the number of displays in that room (Smin). Then the system uses the following formula to determine the optimal number of maximum streams (Xopt):

$$X\text{opt}=\text{INT}[(S\text{min}-LVC)/(N-1)]$$

where LVC is the number of LVC conferences in the call
N is the total number of rooms in the call, including any LVC conference
Xopt is a value rounded down to the next integer
As discussed above, the optimal maximum stream value is used by the system as the maximum number of streams to use in the conference unless the user overrides the setting by choosing another maximum stream value between 1 and the absolute maximum stream value, via the drop down list during initial entry of the conference-variable information.

Preliminary Compliance and Diagnostic Checks

After completion of the entry of conference-variable information, the system will preferably make initial determinations to ensure that the desired conference configuration is feasible. If the desired conference configuration is not feasible, the system preferably displays an appropriate error message to the user.

Specifically, to ascertain whether a conference may be configured according to the user input, the system preferably performs certain preliminary compliance and diagnostic checks. A first preliminary compliance check is related to the number of active cameras in each telepresence room. To establish a desired conference, each telepresence room (i.e., non-LVC conference) in the conference must have a sufficient number of active (i.e., operable) participant cameras to capture a unique image for each other room in the conference (including any LVC conference). This ensures that each remote room in the conference (including any LVC conference) can be sent a unique viewing angle. Thus, the number (C) of active participant cameras in each telepresence room must be greater than or equal to the number of rooms in the conference (N) minus one, plus any LVC conference in the call. [C>=N−1+LVC].

The system may include automated or manual diagnostic routines and procedures to determine at this point in time, whether any of the participant cameras are inoperable or otherwise unavailable for use in the teleconference. The system may consider a camera to be inoperable of unavailable if an associated display is inoperable or unavailable.

It can be appreciated that the above requirement is not necessary for LVC conferences in a conference because such rooms have only one camera and thus transmit the same image to all other rooms in a conference.

A second preliminary compliance check is related to the number of active displays in each telepresence room. Each telepresence room (i.e., non-LVC conference) in the conference must have a sufficient number of active participant displays to display at least one incoming video stream from all of the other rooms in the conference. Ordinarily, for each telepresence room, each active participant display will display only one incoming video stream. Thus, for such each telepresence room in the conference, the number of active participant displays in the room (D) must be greater than or equal to the number of telepresence rooms on the conference (N) minus one, plus any LVC conference [D>=N−1+LVC].

As with cameras, the system may include automated or manual diagnostic routines and procedures to determine at this point in time, whether any of the participant displays are inoperable or otherwise unavailable for use in the teleconference. The system may consider a display to be inoperable of unavailable if an associated camera is inoperable or unavailable.

A third preliminary compliance check is related to alternative presentation or a lectern presentation. When such an alternative (or lectern) presentation is desired, one telepresence room is designated as the initiating room, meaning that the alternative (or lectern) presentation will be generated (at least initially) from the initiating room. A necessary requirement for such a conference is that each non-initiating, telepresence room (i.e., non-initiating, non-LVC room) must have an active alternative presentation display. The system may include automated or manual diagnostic routines and procedures to determine whether any desired alternative presentation equipment or displays are inoperable or otherwise unavailable.

Each LVC may not require a separate alternative presentation display since, with some systems, such an alternative presentation will be displayed in one of the "boxes" of the standard array of boxes in a single LVC display (i.e., a "Hollywood Square" format).

If any of the above three conditions are not met for any telepresence room in the conference, the system preferably terminates the scenario algorithm and generates an error message, such as "Cannot set up the call because of insufficient equipment in Room {Name}," where {Name} is replaced by a predetermined name of the room which does not meet the requirements. The system may also identify the missing equipment. Conversely, if all of the above conditions are met, then the desired conference configuration is feasible and the system moves to the next steps to configure the conference.

The system may perform other diagnostic checks at this point, such as to confirm that all necessary audio-video switching equipment located at the conference sites or at a central location are available and operable, and that the necessary network connections and bandwidth are available and operational.

Determination of Optimal Conference Configuration

After the preliminary compliance checks and preliminary diagnostic checks, the system preferably proceeds to configure the desired conference. The end result of the configuration process is one or more conference configuration scripts which are transmitted to equipment at the central network location and the sites of the various teleconference rooms to interconnect the rooms for the teleconference.

Prioritization of Rooms in the Room List

As a first step in the configuration of the teleconference, the system preferably creates a room list consisting of the desired rooms entered by the user during entry of the conference-variable information. The system preferably performs a first sort of the room list according to predetermined prioritization criteria. Prioritization of the rooms is not absolutely necessary, but there are scenarios when prioritizing the rooms provides optimal vectoring and resource utilization for the room with highest priority. By prioritizing the rooms the system ensures that rooms with higher priority get improved vectoring and resource utilization.

Prioritization of the rooms can be done based on many different parameters. The system can assign the highest priority to a room with the highest number of participants, the highest number of displays or camera, or even some combination of the number of participants, displays and camera. The prioritization algorithm may be adjusted as and when required because changes would not require substantial changes to the remainder of the system.

Below is a representation of a prioritization logic which is based primarily on (display number+camera number) and secondarily on (participant number) in each room. The algorithm implements a sorting logic. As can be appreciated, various sorting algorithms may be used instead, like bubble sort, merge sort, heap sort or quick sort, or other sorting algorithms.

```
START
FOR each room indexed 'I' in the room-list from 1 to N = size of the list
    FOR each room indexed 'J' in the room-list from N down-to ('I'+1)
        IF (display no. + camera no.) of room at index ('J'-1) == (display no. + camera no.) of room at index ('J') THEN
            IF (participant no.) of room at index ('J'-1) >= (participant no.) of room at index ('J') THEN
                swap the rooms between positions ('J') and ('J'-1)
            END IF
        ELSE
            IF (display no. + camera no.) of room at index ('J'-1) > (display no. + camera no.) of room at index ('J') THEN
                swap the rooms between positions ('J') and ('J'-1)
            END IF
        END IF
    END FOR
END FOR
STOP
```

After completion of the prioritization sort of the room list, the system preferably adds any LVC conferences to the end of the room list.

Positioning of Rooms in the Room List

The system may also perform a second sort of room in the room list to position the rooms in the room list according to a predetermined position weight, or may perform this second sort instead of the first sort. This sort is intended to replicate the positions in which remote rooms are displayed on multiple displays within a given telepresence room so that repeat teleconference participants become accustom to and comfortable with the positions of the other rooms. It has been found that such replication enhances the simulation of an in-person meeting.

For example, consider the scenario where a company using the teleconference system has telepresence rooms in New York, London, Paris and Tokyo, each of which has 4 displays. In a call with New York, London and Tokyo in the morning at 10:00 AM, participants in the room in New York may see participants from London in the left two screens and participants from Tokyo in the right two screens. Later, in a call in the evening at 4:00 PM if the participants in London do not appear in the left two screens then it may lead to confusion for the participants who also participated in the first call in the morning. To eliminate this confusion for the users and to give users a consistent view every time they participate in a conference, the system may employ the positioning algorithm to fix positions with each room.

The positioning is another sorting algorithm based on a predetermined position weight associated with every room. As can be appreciated various sorting algoritiuns may be used to accomplish the sort. One suitable sorting algorithm is set forth below.

```
START
FOR each room indexed 'I' in the room-list from 1 to N = size of the list
    FOR each room indexed 'J' in the room-list from N down-to ('I'+1)
        IF (positioning weight) of room at index ('J'-1) >= (positioning weight) of room at index ('J') THEN
            swap the rooms between positions ('J') and ('J'-1)
        END IF
    END FOR
END FOR
STOP
```

Rooms are sorted in order depending on their weight value from lowest to highest. Consider 5 rooms and their weight: London—1, Paris—2, New York—3, Tokyo—4, and Sydney—5. The important thing here is for in any call involving New York, the participant may want to see London and Paris in the left, and Tokyo and Sydney in the right. For calls below they will be ordered, from left to right:

London, Paris, NY
London, NY Tokyo
Paris, NY, Sydney
London, NY, Sydney
Paris, NY, Tokyo
London, Paris, NY, Sydney
Paris, NY, Tokyo, Sydney
London, Paris, NY, Tokyo, Sydney In no case will Paris be on the left most side if London is present in call for the NY participants. As shown, the weight values are sequential integers, however other sequential or non-sequential values may be used to indicate relative positional weighting of rooms. Further, the values may be sorted from highest to lowest, if the pre-detennined positional weight values are arranged in reverse order.

Determine Distribution of Streams Between Each Room in Call

Upon completion of the prioritization and positioning procedures, the system proceeds to determine the distribution (and number) of streams between each room in the call. To accomplish this procedure, the system employs an iterative, reverse hill-climbing algorithm using the configuration tables set forth above to determine the most optimal, feasible configuration for the teleconference.

In selecting configuration setting for a particular room from the appropriate configuration table, the system first chooses the most optimal configuration for the room, which is identified by the configuration with the lowest priority value of '0'. As can be appreciated, other values, or reversed values can be used to indicate relative priority. If the selected configuration is not feasible, the system then selects then next lower optimal configuration and attempts to configure the conference. The system continues with the iterative process, which sometimes requires backing out settings made for previous rooms to arrive at a workable configuration for all rooms. The algorithm employed by the system may be described as a reverse hill-climbing algorithm because the system knows of and attempts to use the most optimal configuration first and then, if necessary, backs down to successively lesser optimal configurations until workable configurations are achieved for all rooms in the call.

A pseudo code for the algorithm, including the prioritizing and positioning procedures is set for the below.

1. START
2. Get list of rooms from DSMConference as roomList.
3. PRIORITIZE the rooms in roomList. [as described above]
4. If the conference using LVC add LVC conference at the end of the roomList.
5. POSITION the rooms in roomList. [as described above]
6. Initialize algorithm specific data for all rooms in the room list.

-continued

7. FOR each room in the roomList LOOP UNTIL all rooms exhausted or vectoring SUCCESSFUL.
   a. Pickup the current room as room identified by current roomIndex.
   b. Get configuration(s) for the current room for the combination of configuration factors (room type + operation mode + number of rooms in the call + max streams)
   c. Identify the next configuration to process in the current context.
   d. IF there is no configuration left to process THEN
      i. ROLLBACK any stream distribution done last time.
      ii. START this process from step 7(a) with the PREVIOUS room. - RECURSIVE CALL
   e. ELSE
      i. DISTRIBUTE the streams of this configuration of this room to ALL Other rooms.
      ii. IF stream distribution SUCCESSFUL THEN
         1. START this process from step 7(a) with the NEXT room. - RECURSIVE CALL
         2. Set distribution success of this room as TRUE
      iii. ELSE
         1. ROLLBACK any stream distribution done last time.
         2. START this process from step 7(c) with the CURRENT room. - RECURSIVE CALL
      iv. END-IF
   f. END_IF
8. END-FOR_LOOP
9. IF all rooms stream distribution status is successful then we achieved vectoring successfully else vectoring not possible for the given conference.
10. Conclude and generate stream table from the stream distribution on SUCCESS - [Logic described below]
END Step 7(e)(ii) is "IF stream distribution SUCCESSFUL THEN START this process from step 7(a) with the NEXT room. —RECURSIVE CALL. In this step "Successful" means that, for the present room, it was possible to assign the number of outgoing and incoming streams designated in the stream_comb_out and stream_comb_in fields of the current configuration to and from the other rooms in the call. In other words, in the present room and other rooms, the number of active displays and cameras is sufficient to accept the designated number of outgoing and incoming streams, in addition to any previous designations.

Step 7(c) states "Identify the next configuration to process in the current context." In this step, the system selects the next lesser optimal (or next lesser preferable) configuration for the current room, which configuration has not yet been used in a previous attempt to configure the current room, unless the system has rolled back and changed the configuration of a previously configured room, in which case the system may re-try previously tried configurations for a subsequent room. However, the system does not attempt to re-use a configuration if all configurations for the room next in the room list failed (i.e., during a roll back).

As indicated in step 7(e)(iii)(1), the algorithm rolls back any stream distributions made for the current room if all distributions identified in the current configuration for the current room are not successful. However, if all possible configurations fail for the current room, then the system rolls back the distributions made for the previous room (7(d)(i)) and tries the next lesser optimal configuration for the previous room (7(c)). Assuming the next lesser optimal configuration was successful for the previous room, the system then proceeds to re-attempt stream distribution for the previously-failed room (now the current room) starting with the most optimal configuration, even if the most optimal configuration failed previously. In this instance, the system will attempt to use a previously failed configuration because the configuration for at least one previous room has changed since the prior iteration for the current room. Therefore, a configuration that failed previously for the current room may be feasible now.

Generation of the Stream Table

The distribution of streams among the rooms in the conference as described above determines the number of streams that pass between each room in the conference. To determine which displays and cameras of each of the rooms are connected together, the system proceeds to generate a stream table, which is a two-dimensional array having N columns and M rows, where N is equal to the number of rooms in the call, and M is equal to the aggregate number video streams in the conference, a video stream being a stream of video data from a camera, which is presented on a display.

Figure 5:
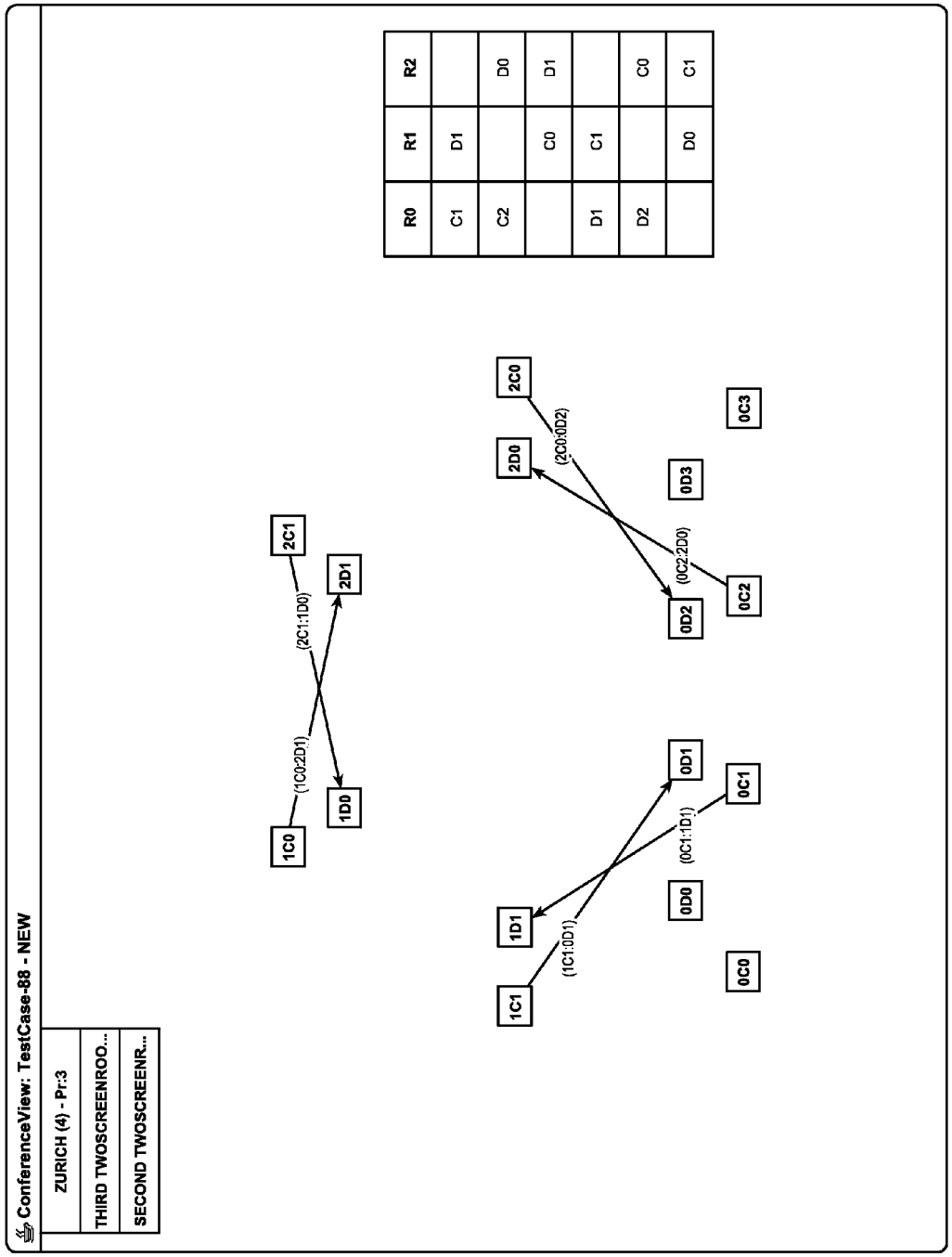
FIG. 5 is a schematic representation of a 3-way teleconference.

Referring to FIG. 5, a 3-way conference between a first room having 4 cameras and displays and second and third rooms each having 2 cameras and displays is depicted along with a stream table suitable for the conference configuration. In the schematic, the first room in the sorted room_list is positioned at the bottom of a virtual conference circle (i.e., at the 6 o'clock position), with the subsequently sorted rooms proceeding clockwise around the virtual circle. The cameras of the first room are designated as 0C0, 0C1, 0C2 and 0C3, indicating the '0' room and the position of the associated camera/display pair from left to right (as viewed by participants in that room) starting with the 0 position.

The streams passing between the rooms are indicated by the directional arrows, which start at a camera and ultimately end at a display. The stream table array on the right side of the figure shows the connections between the various cameras and displays in the conference in tabular form, as specified by the configuration settings chosen by the system during the configuration processes. In the normal mode of operation, cameras and displays are connected in reciprocal fashion. Therefore, since in the first row of the stream table, camera 1 of room 0 is connected to display 1 of room 1, then camera 1 of room 1 is connected to display 1 of room 0, as indicated by row 4 of the table. However, it should be noted that in other modes of operations, such as the 'executive' mode, the reciprocal connections may not always exist.

Figure 6:
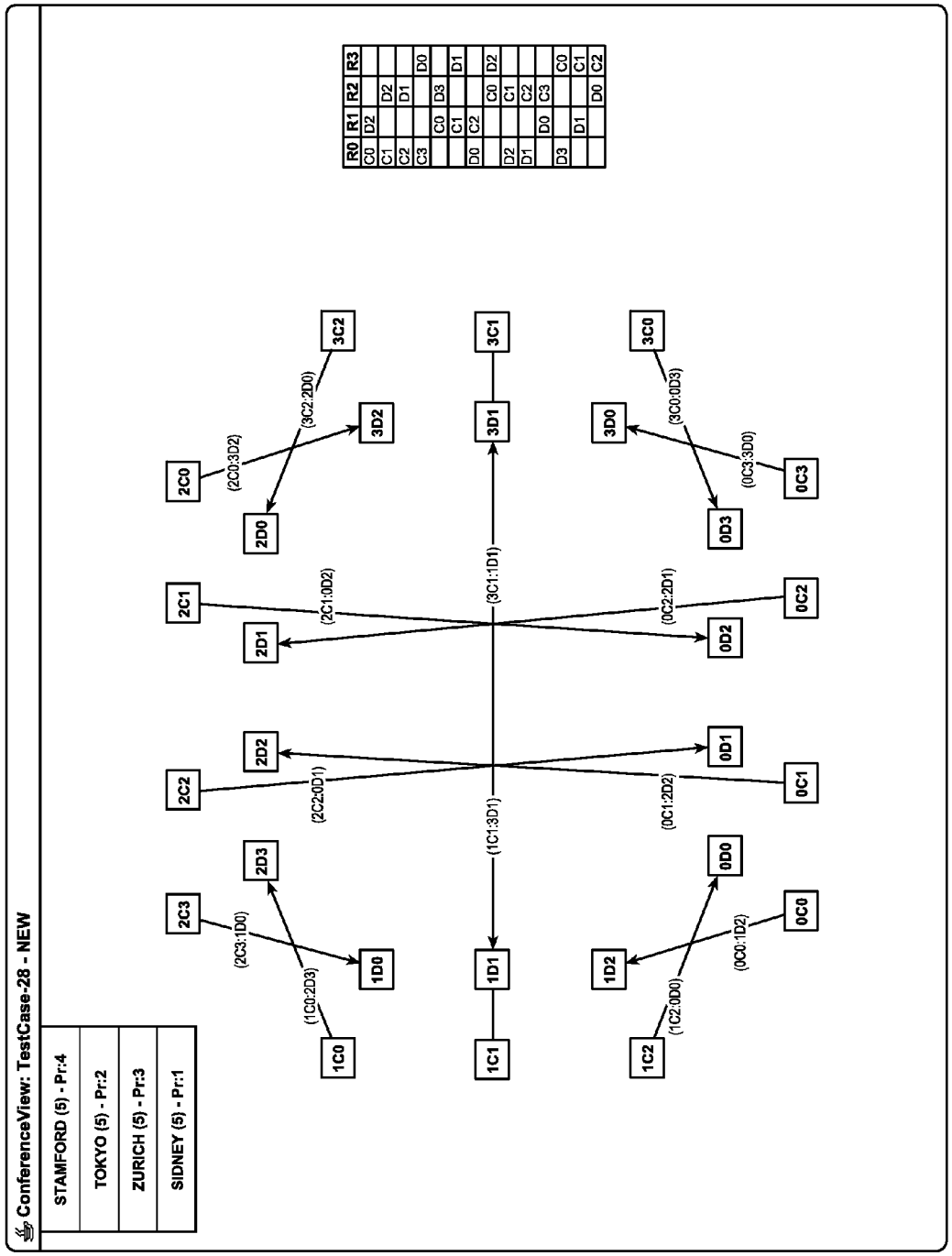
FIG. 6 is a schematic representation of a 4-way teleconference.
Figure 7:
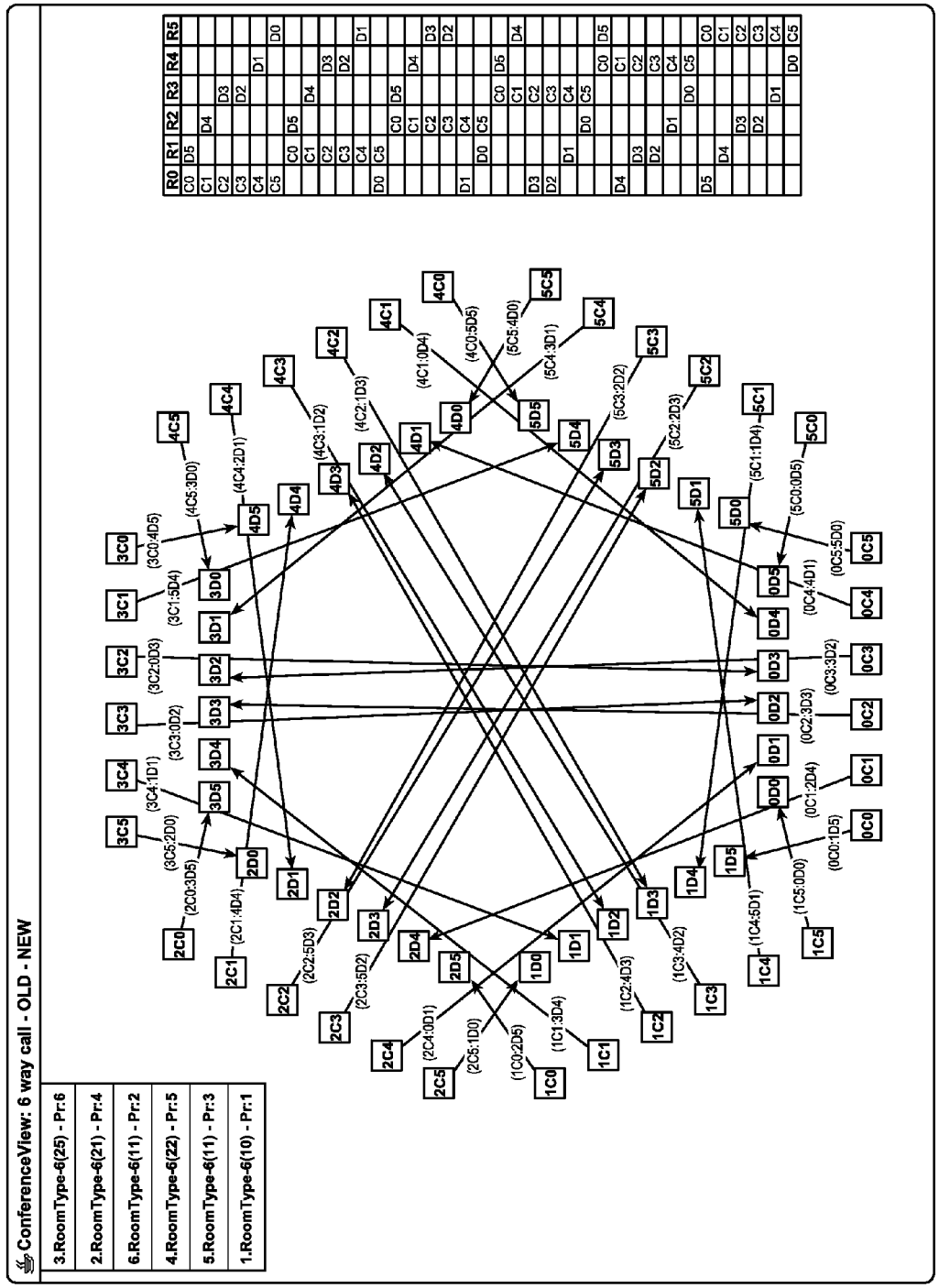
FIG. 7 is a schematic representation of a 5-way teleconference.

Referring to FIGS. 6 and 7, 4- and 5-way conferences are depicted in schematic form, along with the corresponding stream tables as generated by the system. As can be appreciated, the stream table is a suitable means to set forth the necessary connections in conferences of many (or any number of) rooms, and among rooms having various numbers of camera/display pairs.

As mentioned above the connections between cameras and displays in a conference is determined by information in the streams_out and streams_in field of the configurations chosen by the system during the configuration processes. For example, in Table E, the 5$^{th}$ configuration is suitable for a room type 3 (3 displays, 3 cameras), operating in normal mode, in a call with 3 rooms total (i.e., 2 other rooms), with a maximum stream value of 2. The information in the streams_out field for this configuration is "0,1|2", which indicates that cameras 0 & 1 (i.e., the left-most, and next camera to the right) are to be connected to the next room in the room list, which is the next room clockwise in the virtual circle, and camera 2 is to be connected to the room after the next room in the room list, which is two rooms away clockwise in the virtual circle from the present room, with the vertical bar indicating the separation between the rooms. The streams_in information provides similar information for streams coming in to the room. In particular, the streams coming in from the next room clockwise in the virtual circle are to be assigned to display numbers '0' and '1,' and the stream coming in from the room after the next room clockwise in the virtual circle is to be connected to display number '2'.

As a comparison, the 4$^{th}$ configuration in table E is similar to the 5$^{th}$ configuration however the maximum stream value is 1, not 2. Therefore there can only be one stream passing between the rooms. Accordingly, the streams_out information is "0|1" which indicates that camera '0' is to be connected to the next room clockwise in the virtual circle and camera '1' is to be connected to the room after the next room clockwise in the virtual circle.

Below is a stream table generation algorithm suitable for generating a stream table as depicted, from a plurality of configuration chosen by the system.

```
START
FOR each room in the room-list identified by roomIndex.
  Get the 'out-streams' for the room at hand separated in parts.
    Example: out-stream = [0|1, 2|3].
    Part [1, 1] = 0
    Part [2, 1] = 1, Part [2, 2] = 2
    Part [3, 1] = 3
    FOR each Part-list after break character '|' identified by
    partIndex1
      FOR each Part in part-list after break character ','
      identified by partIndex2
        1. streamTableRow[roomIndex] = 'C' + Part [
        partIndex1, partIndex2]
        2. nextRoomIndex = generate next room index from
        current position
        3. Get the 'in-stream' for the room identified by
        nextRoomIndex separate in parts.
        4. inStreamIndexPart1 = in-streams part length – 1 –
        partIndex1
        5. inStreamIndexPart2 = in-streams part[partIndex1]
        length – 1 – partIndex2
        6. streamTableRow[nextRoomIndex] = 'D' + Part
        [inStreamIndexPart1, inStreamIndexPart2]
        7. insert 'streamTableRow' into stream table
      END FOR
    END FOR
  END FOR
END
```

Configuration Script Generation and Transmission

After generating the stream table as set forth above, the system preferably generates scripts to configure and interconnect the teleconference equipment such as to configure the seating position indicator lights and to configure codec teleconference activation and deactivation connector application/systems at each of the telepresence room sites to effectuate the assignments. Preferably such configuration scripts are in a format suitable to be received and executed by application/systems and are transmitted to the application/systems over the network (such as in XML format). Such a configuration script for participant video stream assignments (streams.xml) may be in the following form:

```
-----------------------------Start Streams.xml-----------------------------
<?xml version="1.0" encoding="UTF-8"?>
<Message xmlns:xsi="http://www.w3.org/2001/XMLSchema-instance">
  <Stream>
    <Encoder>
      <IPAddress>1.2.2.3</IPAddress>
      <EncoderName>london0</EncoderName>
      <SlotId>1</SlotId>
      <PortId>0</PortId>
      <CopyNum>0</copyNum>
      <UDPPort>4443</UDPPort>
    </Encoder>
    <Decoder>
      <IPAddress>1.2.2.3</IPAddress>
      <DecoderName>India1</DecoderName>
      <SlotId>1</SlotId>
      <PortId>0</PortId>
      <CopyNum>0</copyNum>
      <UDPPort>5000</UDPPort>
    </Decoder>
  </Stream>
  <Stream>
    <Encoder>
      <IPAddress>1.2.2.4</IPAddress>
      <EncoderName>london1</EncoderName>
      <SlotId>1</SlotId>
      <PortId>0</PortId>
      <CopyNum>0</copyNum>
      <UDPPort>4443</UDPPort>
    </Encoder>
    <Decoder>
      <IPAddress>1.2.2.3</IPAddress>
      <DecoderName>India0</DecoderName>
      <SlotId>1</SlotId>
      <PortId>0</PortId>
      <CopyNum>0</copyNum>
      <UDPPort>5000</UDPPort>
    </Decoder>
  </Stream>
  <Stream>
    <Encoder>
      <IPAddress>1.2.2.6</IPAddress>
      <EncoderName>london2</EncoderName>
      <SlotId>1</SlotId>
      <PortId>0</PortId>
      <CopyNum>0</copyNum>
      <UDPPort>4443</UDPPort>
    </Encoder>
    <Decoder>
      <IPAddress>1.2.2.8</IPAddress>
      <DecoderName>India2</DecoderName>
      <SlotId>1</SlotId>
      <PortId>0</PortId>
      <CopyNum>0</copyNum>
      <UDPPort>5000</UDPPort>
    </Decoder>
  </Stream>
</Message>
-----------------------End Streams.xml-----------------------------
```

If a laptop alternate presentation is in the conference, the system preferably generates and transmits a laptop alternate presentation configuration script, which may, for example, transmitted to Lara echo presentation connector applications. Such a laptop alternate presentation configuration script (presentation.xml) may be in the following form:

```
-----------------Start Presentation.XML----------------------------
<? xml version="1.0" encoding="UTF-8"?>
<Display xmlns:xsi="http://www.w3.org/2001/XMLSchema-instance">
  <VGA>
    <SourceIPAddress>12.23.345.4 </SourceIPAddress>
    <DestinationIPAddress> 12.34.45.6</DestinationIPAddress>
    <DestinationIPAddress> 12.34.45.7</DestinationIPAddress>
    <DestinationIPAddress> 12.34.45.8</DestinationIPAddress>
  </VGA>
</Display>
-------------------------End Presentation.xml-------------------------
```

If a DVD alternate presentation is in the conference, the system preferably generates and transmits a DVD alternate presentation configuration script. Such a DVD alternate presentation configuration script may be in the following form:

```
--------------Start DVDPresentation.xml----------------------------
<?xml version="1.0" encoding="UTF-8"?>
<Dvd>
  <Stream>
```

```
    <Encoder>
        <IPAddress>1.2.2.3</IPAddress>
        <EncoderName>london0</EncoderName>
        <SlotId>1</SlotId>
        <PortId>0</PortId>
        <UDPPort>4443</UDPPort>
    </Encoder>
    <Decoder>
        <IPAddress>1.2.2.5</IPAddress>
        <DecoderName>India1</DecoderName>
        <SlotId>1</SlotId>
        <PortId>0</PortId>
        <UDPPort>5005</UDPPort>
    </Decoder>
    <Decoder>
        <IPAddress>1.2.2.8</IPAddress>
        <DecoderName>Singapore1 </DecoderName>
        <SlotId>1</SlotId>
        <PortId>0</PortId>
        <UDPPort>5000</UDPPort>
    </Decoder>
    <Decoder>
        <IPAddress>1.2.2.10</IPAddress>
        <DecoderName>boston </DecoderName>
        <SlotId>1</SlotId>
        <PortId>0</PortId>
        <UDPPort>5000</UDPPort>
    </Decoder>
    <Stream>
</Dvd>
-------------End DVDPresentation.xml----------------------------------
```

Preferably, each assignment is recorded in a log file for debugging.

If lectern alternate presentation is in the conference, the system preferably generates a lectern alternate presentation script, as set forth below. The room that is selected as the source will have a stream connected from the source encoder to each destination decoder, and each destination encoder will connect to the source decoder. The encoder and decoder that can be used will have active status as 'L'.

```
----------------Example Lectern XML------------------------------------
<?xml version="1.0" encoding="UTF-8"?>
<Lectern>
    <Stream>
        <Encoder>
            <IPAddress>10.254.230.13</IPAddress>
            <Name>CameraFour</Name>
            <SlotId>1</SlotId>
            <PortId>5</PortId>
            <UDPPort>5040</UDPPort>
        </Encoder>
        <Decoder>
            <IPAddress>10.254.230.45</IPAddress>
            <Name>DisFour</Name>
            <SlotId>1</SlotId>
            <PortId>5</PortId>
            <UDPPort>5040</UDPPort>
        </Decoder>
    </Stream>
    <Stream>
        <Decoder>
            <IPAddress>10.254.230.13</IPAddress>
            <Name>CameraFour</Name>
            <SlotId>1</SlotId>
            <PortId>5</PortId>
            <UDPPort>5040</UDPPort>
        </Decoder>
        <Encoder>
            <IPAddress>10.254.230.45</IPAddress>
            <Name>DisFour</Name>
            <SlotId>1</SlotId>
            <PortId>5</PortId>
            <UDPPort>5040</UDPPort>
        </Encoder>
    </Stream>
</Lectern>
--------------------------------end of Lectern XML-----------------------
```

Figure 8:
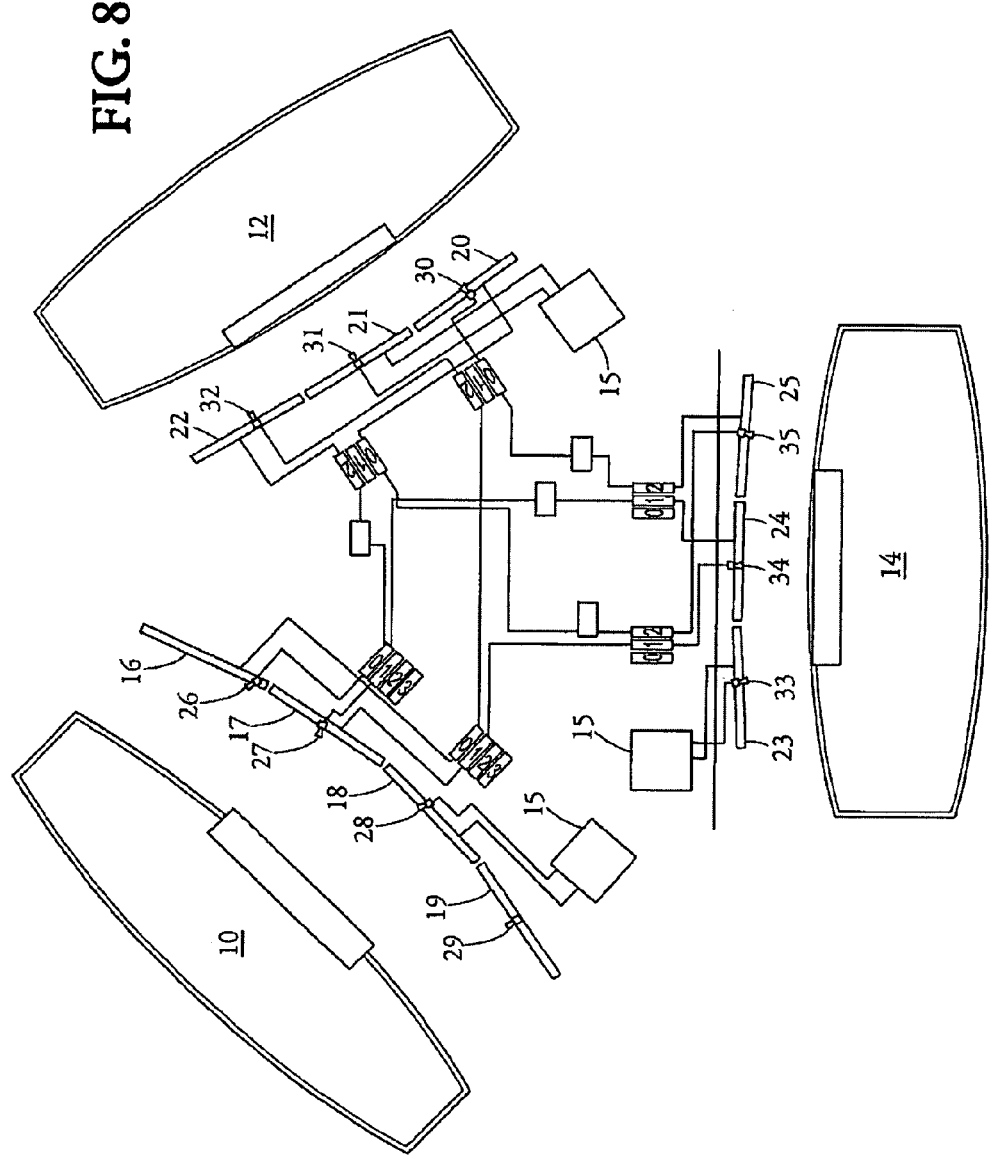
FIG. 8 is a schematic representation interconnections between equipment in the rooms in a 3-way teleconference.

Referring to FIG. 8, processing of the configuration scripts results in appropriate interconnections between switching and codec equipment employed in the teleconference, which equipment may be located at the sites of the various rooms in the conference or may located at a central location. For example, in a conference having three telepresence rooms 10, 12 and 14, with displays 16, 17, 18, 19, 20, 21, 22, 23, 24 and 25 and cameras 26, 27, 28, 29, 30, 31, 32, 33, 34 and 35, and one LVC room 15, the system may interconnect certain camera and display codecs (labeled "0", "1", "2" and "3") to effect the desired configuration. If an LVC 15 is in the call, the LVC may be connected to a camera/display pair in each room. As can be appreciated, the interconnection depicted in FIG. 8 are but one possible configuration and may not be the most optimal configuration.

Post-Configuration Testing and Diagnostics

After configuration of the teleconference and before conducing the teleconference, the system may perfonn various automated, semi-automated or manual diagnostic procedures to confirm operation of all of the necessary equipment in the room. Upon failure of a necessary piece of equipment, such as a camera, display or codec, it may be necessary to reconfigure the teleconference. In this case the system may re-run the configuration procedures beginning with sorting the rooms according to priority, which may be based in part on the existence of certain operable equipment. Alternatively, the system may re-run the configuration beginning with the procedure to determine stream distributions between the room in the conference, preferably starting with the first room in the room list.

Performance and Termination of Telepresence Conference

Upon the completion of the post-configuration diagnostics and re-configuration (if necessary), the system may activate the teleconference, at a predetermined time or upon receipt of a command or commands from the user. The teleconference remains active until a predetermined termination time, if one has been established, or upon receipt of a command or commands from a user to terminate the conference.

The special purpose computers and/or general purpose computers located at the site of the system operator (e.g., the NOC) preferably perform all (or a majority) of the processing to configure each teleconference and to interconnect the teleconference equipment. Specifically, the data tables referred to above (i.e., the room, mode and configuration tables) are preferably computer data tables stored in or accessible by the computers of the system operator. During initiation of a teleconference, the conference-specific data is preferably entered into computer data terminal connected to the computers of the system operator, such as a data-entry terminal or computer located at the site of the system operator or at the site of one of the rooms participating in the conference, or at another location. During the entry of the conference-specific data, the computers of the system operator preferably perform the steps of determining the maximum number and optimal number of streams between rooms in a conference, and provide such information to the data entry terminal. Subsequent to the entry of the conference-specific data, the computers of the system operator preferably perform the steps of preliminary compliance and diagnostic checks, prioritization & positioning of rooms in the room list, determining the distribution of streams between each room in the conference, generation of the stream table, generation & transmission of the configuration scripts to the teleconference equipment, post-configuration testing and diagnostics, and optionally termination of the conference.

Remote Gateway Device

Referring to FIG. 8, to accommodate an LVC conference into a conference with telepresence rooms, each telepresence site or room may include a LVC-specific codec 15 suitable to interconnect a camera and display pair (e.g., pair 23, 33) in each telepresence room with the equipment or system of one or more predetermined providers of legacy video conference services. However, instead of such an LVC-specific codec in each room or site, the system preferably includes a gateway device (not shown) located remotely from at least one of the telepresence rooms in the conference which is operable to simultaneously interconnect a plurality of external sources of audio and/or video to the telepresence conference, provided such external sources comply with at least one of a plurality of predetermined audio/video standards, such as H.323, SIP, or the like, and/or comply with a predetermined standard of a provider of legacy video conferencing services.

The gateway device is operable to interconnect and distribute such external sources to one of the (non-LVC-specific) telepresence conference codecs located at the site or room of each telepresence room in a telepresence conference, and is operable to perform any necessary translations of audio/video data or transmission protocol necessary to interconnect such external sources to such telepresence codecs. Thus, the remote gateway device eliminates the need for each telepresence site or room to have an LVC-specific codec.

Enhanced Directional Audio

To enhance the simulation of an in-person conference, each participant speaker associated with each display/camera pair is preferably located adjacent the associated display/camera pair. The assignments made above simultaneously assign each participant speaker to the remote room assigned to the associated (adjacent) display/camera pair, via the associated Audio/Video codec. Thus, conversation and other audio generated at a remote room will be reproduced in the local room adjacent the assigned display/camera pair.

More specifically, to further enhance the simulation of an in-person conference in telepresence rooms having composite participant displays comprising multiple individual displays and having a separate participant speaker associated with each of the multiple participant displays, sound produced by conference participants in other rooms is preferably reproduced only by (or substantially only by) the participant speaker associated with the participant display in which the participant appears. Thus, the attention of participants is instinctively and automatically drawn to the direction of the participant display in which the video image of a person speaking is presented even without visual clues as to which one of the remote participants is talking. Such one-to-one spatial association of video and audio is particularly effective in conferences where 3 or 4 participant displays are active in a given room.

As described above, the system preferably directs participants to predetermined seating locations by automatically activating the seating position markings 110 (and most preferably the seating position lights) according to a predetermined algorithm processed by the computers of the system operator, which algorithm is based on the number of participants present in the room. Alternatively or additionally, the system could direct participants to seating locations via a display or readout located in the telepresence room. In general, the system directs the individuals to fill the conference table from the center out. For example, if the conference table includes eight seating locations (numbered 1 through 8, from left to right facing the participant displays) and one or two persons are participating in the conference in that room, the system preferably directs the participant(s) into one of seating locations 5 & 6 (on either side of the center line 100). Alternatively, the system could direct the participant(s) to other adjacent seating locations such as numbers 4 & 5, or 6 & 7. If three or four persons are in the room, the system preferably directs the participants to seating locations 3, 4, 5 & 6. Likewise, if seven or eight participants are in the room, the system directs the participants to seating locations 1 through 8. Thus, the system knows the seating locations of all of the participants in each room.

The system preferably automatically activates or deactivates participant microphones depending on whether a participant has been directed to a seating locating associated with the particular microphone. Preferably, each participant microphone 40 in the telepresence conference room is associated with a pair of (two) predefined seating locations 108 and is located substantially equidistant to each of the pair. Each participant microphone 40 is preferably a cardioid microphone. The area of conversational sensitivity of each participant microphone 40 to ordinary conversation-level sound preferably only encompasses the two predefined seating locations 108 with which each participant microphone 40 is associated. As can be appreciated, for each microphone, the physical positioning and the boundary of the area of conversational sensitivity serves to substantially limit the amount of conversation-level sound picked up by each participant microphone 40 to that conversation-level sound generated by the participants located in the pair of seating locations associated with each participant microphone 40. For example, in a typical telepresence conference room having eight seating locations numbered 1 through 8 (from left to right), participant microphones numbered 1 through 4 (from left to right) may be associated with seating locations 1 & 2, 3 & 4, 5 & 6 and 7 & 8, respectively.

Where only one video stream is sent from a first room in a telepresence call to a second room, all participants in the first room appear on one participant display in the second room and all of the sound produced in the first room (and picked up by the active participant microphones in the first room) is reproduced in the second room preferably only by the one participant speaker associated with the participant display assigned to the first room. The audio signal associated with such one video stream consists of a combination (i.e., sum) of the signals from all of the active participant microphones in the first room.

Where multiple video streams are exchanged between rooms in a telepresence conference the multiple audio streams are also exchanged. For example, where two video streams are sent from a first room to a second room, a first video stream is generated by a first participant camera capturing a first group of participants in the first room and a second video stream is generated by a second participant camera in the first room capturing a second group of participants. The first video stream (and first group of participants) is displayed on a first participant display in the second room. Likewise, the second video stream is displayed on a second participant display in the second room. To provide enhanced directional audio in such circumstances, the system preferably isolates the audio for each stream. Specifically, the sound produced by the first group of participants is preferably reproduced in the second room only by (or substantially only by) the participant speaker associated with the first participant display. Likewise, the sound produced in the first room by the second group of participants is preferably reproduced in the second room only by (or substantially on by) the participant speaker associated with the second participant display.

A first set (of one or more) participant microphones is associated with the seating locations of the first group of participants in the first room, as described above. Likewise, a second set of microphones (of one or more) is associated with the seating locations of the second group of participants in the first room. For example, if the first group of participants consists of four persons, the first set of participant microphones may consists of two microphones.

The system determines the number of streams to be exchanged between each room in the conference depending on a number of factors. For each outgoing video stream, going from the first room to a second room, the system determines the seating locations to be encompassed in the video stream and configures the participant camera generating that video stream accordingly, which configuration may include adjusting a pan, tilt and/or zoom setting of the participant camera, a position of the camera along a track, and/or a digital crop of the captured images. For example, if one video stream is to be sent from a first room to a second room, the system configures a single participant camera in the first room to capture all of the participants in the first room. Further the system creates the audio stream associated with such single video stream by summing the signals of all of the (or more preferably, all of the active) participant microphones in the first room. Such summing is preferably implemented by equipment located in the room or site of each telepresence room, for example by the 16×16 switch 39, or a similar device. Further, such summing may be implemented at a central location or the location of the second (receiving) room, or a combination of locations.

If two video streams are to be sent from the first room to the second room, the system uses two participant cameras to generate first and second video streams. The system configures the first participant camera to capture a first group of participants (in a first group of predetermined seating locations) and configures the second participant camera to capture a second group of participants (in a second group of seating locations). Further, the system creates the audio stream associated with first video stream by summing the audio signals generated by the participant microphones associated with the first group of seating locations. Likewise, the system generates the audio stream associated with second video stream by summing the audio signals generated by the microphones associated with the second group of seating locations. Again, such summing may be implemented locally (in the first room) and/or remotely (in a central location or in the second room), or in several locations. Where more than two video streams are sent to another room, a similar process is used to segregate the audio signals associated with each video stream.

The system employs the configuration information contained in the stream table to effect the connections of the audio streams to the appropriate participant speakers in the conference. Preferably, after the system sums the audio signals of a group of seating locations (if summing is necessary), the system connects the audio stream to a participant speaker associated with the participant display on which the associated video stream is displayed. More particularly, the proper room number to send the audio stream is identified by the row of the stream table and the proper participant speaker is identified by the corresponding position indicator of the associated participant display, since the position indicator of the associated participant speaker is the same as that of the associated display. Therefore, the conversation of the participants displayed in each participant display is reproduced in close proximity to the images, which provides for a realistic and compelling spatial association of video and audio.

As described above, an echo-canceling device may be employed to minimize or eliminate echoes and feedback. Preferably, each site or room includes a multi-input and multi-output echo-canceling device which is remotely configurable by a central control. The signals being sent to the participant speakers (or any speakers) in a room are also fed to the echo-canceling device (either as separate signals or a summed signal) as a base reference signal or signals in order to remove any echo and/or feedback in the signals generated by the active participant microphones. The processed microphone signals are then passed through the echo-canceling device and distributed to other rooms in the conference. The echo-canceling device may be similar to the echo-canceling device 39 described above; however it preferably includes multiple inputs and outputs and is remotely configurable to interconnect such inputs and outputs in various combinations, or in any permutation of inputs and outputs.

What is claimed:

1. A method of conducting an audio-visual conference among a number of conference rooms comprising:

storing predetermined conference configuration data in one or more computer data tables in a computer system;

said conference configuration data including information for a plurality of room types, where each room type has a unique combination of active participant displays and active participant cameras;

for at least one room type, said conference configuration data has a plurality of unique, feasible combinations of configuration factors, where said configuration factors include, a number of rooms in the conference, and a maximum number of streams to be distributed to another room in the conference, for at least one of said plurality of unique, feasible combinations of configuration factors for said one room type, said conference configuration data includes a plurality of unique, feasible permutations of the number of streams that can be distributed to and received from every other room in the conference;

for each unique, feasible permutation of the number of streams that can be distributed to and received from every other room in the call, said conference configuration data includes stream IDs to be distributed to and received from every other room in the conference, where a stream ID designates a physical position in which an associated participant camera and participant display pair is located in a composite participant display;

for each unique combination of configuration factors having more than one set of (i) the number of streams that can be distributed to and received from every other room in the conference and (ii) stream IDs to be distributed to and received from every other room in the call, said conference configuration data includes a relative preference of each set;

receiving at said computer system conference variable data including identities of a plurality of included conference rooms to be interconnected in a conference, and including a desired maximum number of streams to be distributed to another room in the conference entered by a user or selected by said computer system;

based on said conference variable data, said computer system generating a room list comprising every included conference room and having a highest room at a top of said room list and having a lowest room at a bottom of said room list, and said computer system determining a number of rooms in the conference and a room type for every included conference room;

based on said conference variable data and said room list, said computer system generating interconnection data for each included conference room, said interconnection data comprising instructions to interconnect teleconference equipment in each included conference room to teleconference equipment in every other included conference room;

for each included conference room, said interconnection data being generated according to configuration information in a most preferable, feasible set of configuration data among applicable conference configuration data;

for each included conference room, said most preferable, feasible set of configuration data being selected by said computer system performing a recursive stream distribution process in which said computer system steps through said room list from said highest room to said lowest room and, for each room, steps through any applicable sets of said configuration data in successive order from most preferable to least preferable, according to said relative preference, until a feasible set of configuration data is found which permits interconnection to every other included conference room according to the information in the feasible set of configuration data, and if no applicable set of configuration data is feasible for a current room being processed, then the distribution process returns to a next higher room in said room list and selects an applicable set of configuration data having a lesser relative preference than a previous set of configuration data selected for said next higher room, and then the distribution process again attempts to select a most preferable, applicable set of configuration data for said current room; and transmitting said interconnection data to teleconference equipment in each included conference room to initiate said conference.

2. The method of conducting an audio-visual conference among a number of conference rooms of claim 1, wherein for at least one room type, said configuration factors includes a plurality of unique room modes.

3. The method of conducting an audio-visual conference among a number of conference rooms of claim 1, wherein:
said conference configuration data includes physical position indicators for each connected participant camera to be connected to another included conference room, and includes indicators as to which other included conference room each connected participant camera is connected, based on a relative position in said room list; and
said configuration data indicates physical position indicators for each connected participant display to be connected to another included conference room, and includes indicators as to which other included conference room each connected participant display is connected, based on said relative position in said room list.

4. The method of conducting an audio-visual conference among a number of conference rooms of claim 1, wherein:
after receipt of said identities of said included conference rooms, said computer system determines an optimal number of streams which may be commonly exchanged between all included conference rooms; and
said computer system sets said desired maximum number of streams equal to said optimal number of streams.

5. The method of conducting an audio-visual conference among a number of conference rooms of claim 1, wherein:
after receipt of said identities of said included conference rooms, said computer system determines an absolute maximum number of streams which may be exchanged between two of said included conference rooms; and
during receipt of said conference variable data, said computer system presents said user with means to select said desired maximum number of streams from one stream to said absolute maximum number of streams.

6. The method of conducting an audio-visual conference among a number of conference rooms of claim 5, wherein:
said computer system determines an optimal number of streams which may be commonly exchanged between all included conference rooms; and
in the absence of a selection of a desired maximum number of streams by said user, said computer system sets said desired maximum number of streams equal to said optimal number of streams.

7. The method of conducting an audio-visual conference among a number of conference rooms of 1, further comprising:
said computer system configuring teleconference equipment in a first room of said included conference rooms to send first and second video streams to a second room of said included conference rooms, by configuring first and second participant cameras in said first room to capture first and second groups of participants, respectively, where said first and second groups of participants are seated at first and second sets of seating locations, respectively;
said computer system configuring teleconference equipment in said second room to display said first and second video streams on first and second participant displays, respectively, in said second room;
first and second sets of participant microphones are associated with said first and second sets of seating locations, respectively, in said first room;
said computer system configuring teleconference equipment in said first and second rooms to reproduce a first audio signal on a first participant speaker associated with said first participant display in said second room, where said first audio signal consists essentially of audio signals generated by said first set of participant microphones; and
said computer system configuring teleconference equipment in said first and second rooms to reproduce a second audio signal on a second participant speaker associated with said second participant display in said second room, where said second audio signal consists essentially of audio signals generated by said second set of participant microphones.

* * * * *